(12) United States Patent
Tajima et al.

(10) Patent No.: US 6,572,307 B2
(45) Date of Patent: Jun. 3, 2003

(54) FENDER WITH STEP AND/OR PROJECTION

(75) Inventors: Kei Tajima, Kobe (JP); Yasufumi Kozono, Kobe (JP); Akira Kamigoro, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 0 days.

(21) Appl. No.: 09/739,804

(22) Filed: Dec. 20, 2000

(65) Prior Publication Data

US 2001/0007236 A1 Jul. 12, 2001

(30) Foreign Application Priority Data

Dec. 20, 1999 (JP) ............................. 11-361358
Dec. 20, 1999 (JP) ............................. 11-361359

(51) Int. Cl.$^7$ .......................... E02B 3/26; B63B 59/02
(52) U.S. Cl. ...................... 405/212; 405/211; 405/215; 114/219
(58) Field of Search ................. 405/211, 212, 405/213, 214, 215; 114/219, 220

(56) References Cited

U.S. PATENT DOCUMENTS

| | | | |
|---|---|---|---|
| 3,343,770 A | * 9/1967 | Szonn | 267/153 |
| 3,948,500 A | * 4/1976 | Korbuly et al. | 405/215 X |
| 4,277,055 A | * 7/1981 | Yamaguchi et al. | 114/219 X |
| 4,319,539 A | * 3/1982 | Fujii et al. | 114/219 |
| 4,601,611 A | * 7/1986 | Tagomori et al. | 405/215 |
| 5,054,414 A | * 10/1991 | Yamaguchi | 114/219 |
| 5,791,637 A | 8/1998 | Reichelt et al. | |
| 5,868,384 A | * 2/1999 | Anderson | 267/141.1 |
| 5,975,000 A | * 11/1999 | Nakamura | 114/219 |
| 6,190,091 B1 | * 2/2001 | Byle | 405/212 X |

FOREIGN PATENT DOCUMENTS

| | | | |
|---|---|---|---|
| EP | 0 092 893 | 11/1983 | |
| EP | 405954 | * 1/1991 | ................ 405/215 |
| EP | 0 622 495 | 11/1994 | |
| EP | 0 812 961 | 12/1997 | |
| GB | 2 117 865 | 10/1983 | |
| JP | 4915516 | 4/1974 | |
| JP | 59178239 | * 10/1984 | ................ 114/219 |
| JP | 4-1129 | 1/1992 | |
| JP | 6-26022 | 2/1994 | |
| JP | A6280237 | 10/1994 | |
| JP | A7229129 | 8/1995 | |
| JP | 10-1927 | 1/1998 | |
| JP | A11222833 | 8/1999 | |
| JP | 11-222833 | 8/1999 | |

* cited by examiner

*Primary Examiner*—Jong-Suk (James) Lee
(74) *Attorney, Agent, or Firm*—Birch, Stewart, Kolasch & Birch, LLP

(57) ABSTRACT

A fender for absorbing the impact of a vessel is provided, which is formed of rubber and fixed to a fixing surface of a dock and adapted to have an impact receiving plate secured to a distal end of a body of the fender. The fender comprises a first bumper member having an elongated hollow cylindrical body of a constant outside diameter and affixed to the impact receiving plate at one end, and a second bumper member connected at one end to an opposite end of the cylindrical body of the first bumper member. The second bumper member at the opposite end thereof is fixed to the fixing surface at a portion having a hollow conical body with its distal end being greater in outside diameter than its closest end, and the second bumper member buckling radially outwardly upon receiving a compressive force from the vessel thereby absorbing the impact of the vessel; and a shoulder formed along an outer periphery of a connection portion between the first and second bumper members.

10 Claims, 23 Drawing Sheets

US 6,572,307 B2

FENDER WITH STEP AND/OR PROJECTION

BACKGROUND OF THE INVENTION

The present invention relates to a fender designed to protect a vessel by reducing the impact of the docking vessel through absorption of the kinetic energy thereof.

A fender 9 conventionally used in the art is exemplified by a circle-type fender made of one piece rubber material having a sectional shape as shown in FIG. 20A. The circle-type fender 9 includes: a first bumper member 91 formed in a cylindrical shape of a constant outside diameter and constructed such that one end of the cylindrical body defines a distal end 9a of the fender 9 and serves as a fixing portion for fixing an impact receiving plate (not shown) directly coming into contact with a vessel; and a second bumper member 92 formed in a hollow conical shape wherein one end thereof is connected to the other end of the cylindrical body of the first bumper member 91 while the other end thereof defines a fix portion to be fixed to a fixing surface Q on a dock and wherein the latter end thereof has a greater outside diameter than the former end thereof. Indicated at 93 is a flange actually functioning to fix the fix portion of the second bumper member 92 to the fixing surface Q.

When receiving a compressive force from the docking vessel, the fender 9 is compressively deformed as described below. First, the fender 9 develops a reaction force against the compressive force. When the fender can no more withstand the compressive force, it starts to buckle at an outer periphery of a connection portion CP between the first bumper member 91 and the second bumper member 92 and at an inner periphery of a buckling position BP of the second bumper member 92. Subsequently, as shown in FIG. 20B, the whole body of the fender 9 is deformed into a tightly folded shape with an outer periphery 91a of the first bumper member 91 and an outer periphery 92a of the second bumper member 92 as well as areas 92b, 92c above and below the buckling position BP on the inner periphery of the second bumper member 92 coming into contact with each other. Then, the tightly folded fender 9 with no more portion to be buckled forms a single rubber mass which is further compressively deformed.

If this process is expressed by a distortion-reaction force characteristic curve plotting the amount of distortion of the compressed fender 9 relative to the reaction force developed in the fender 9, a solid curved line of FIG. 21 is obtained. Specifically, a line portion between the origin O and Maximum Point A corresponds to a period between a normal state shown in FIG. 20A and a state just before the fender starts to buckle, yielding to the compressive force. During this period, the compressed fender 9 develops the reaction force, trying to restore itself to its initial shape. The reaction force increases as the amount of distortion becomes greater. Upon buckling, however, the fender 9 loses most of the reaction force. Hence, the reaction force declines during the time that the fender 9 is crushed into the state of FIG. 20B. This time period corresponds to a line portion between Maximum Point A and Minimum Point C of the characteristic curve. In the state of FIG. 20B, the whole body of the fender 9 behaves as a single rubber mass as mentioned supra, developing the reaction force again. Therefore, the reaction force substantially linearly rises from Minimum Point C.

The practically useful range of the fender 9 with such a characteristic curve is limited to a range between the origin O and a point B representing the same level of reaction force as Maximum Point A. The useful range as expressed in terms of distortion is limited to the range of not more than D. This is because a distortion in excess of D means an excessive reaction force which, in turn, will cause damage to the vessel or to the fender 9 itself. The amount of energy that the fender 9 can absorb through distortion D within the allowed range is represented by an area $S_1$ of a region enclosed by the characteristic curve represented by the solid line, a horizontal axis O-D, and a vertical line B-D.

It is generally thought idealistic that the fender is capable of absorbing such an amount of energy that corresponds to the combination of the above area S, and an area $S_2$ of a region enclosed by the characteristic curve and a horizontal line A-B. However, the fender is actually capable of absorbing energy of an amount reduced by that represented by the area $S_2$, thus reduced in the energy absorption efficiency.

In this connection, study has been made to increase the energy-absorption capacity of the fender 9. For instance, it is contemplated to increase thicknesses $T_1$ and $T_2$ of the first and second bumper members 91, 92, as shown in FIG. 22A, thereby to increase the reaction forces of the bumper members 91, 92 against compression.

Unfortunately, this approach has the following problem. With a smaller distortion than in the case of FIGS. 20A, 20B, the fender 9 is buckled into a completely folded state, as shown in FIG. 22B, wherein the outer periphery 91a of the first bumper member 91 and the outer periphery 92a of the second bumper member 92 as well as the areas 92b, 92c above and below the buckling position BP on the inner periphery of the second bumper member 92 come into contact with each other, leaving no more portion to be buckled. That is, with a smaller distortion than in the case of FIG. 20B, the buckled fender 9 starts to behave as the single rubber mass.

As indicated by a dash-single-dot curved line in FIG. 23, this results in a smaller distortion D' than the distortion D in the case of FIGS. 20A, 20B, the distortion D' corresponding to the reaction force which, after buckling, starts to re-increase and reaches a point B' representing the same level as Maximum Point A'. That is, a width of a constant load area in which the fender is principally involved in the energy absorption, or the range A-B between Maximum Point A and the point B of the characteristic curve is reduced to a range A'-B'. Thus, the fender is reduced in the energy-absorption capacity after buckling.

Therefor, the arrangement of FIG. 22A suffers a problem that despite the increased size corresponding to the increased thickness as described above, the fender cannot attain the increased energy-absorption capacity corresponding to the size increase or any increase in the energy-absorption capacity at all.

SUMMARY OF THE INVENTION

A first object of the invention is to provide a novel fender capable of approximating a distortion-reaction force characteristic curve within an allowed range of distortion to an idealistic curve representing a substantially constant value of reaction force after the maximum point.

A second object of the invention is to provide a novel fender capable of presenting the greatest possible energy-absorption capacity within the allowed range of distortion.

According to the invention of claim 1, a fender for absorbing the impact of a vessel, formed of rubber and fixed to a fixing surface of a dock as having an impact receiving plate secured to a distal end of its body, the fender comprising: a first bumper member formed in a cylindrical shape of a constant outside diameter and defining at one end of the cylindrical body thereof a fixing portion for the impact receiving plate; a second bumper member connected at one end to the other end of the cylindrical body of the first bumper member, defining at the other end thereof a fix portion to be fixed to the fixing surface, formed in a hollow conical shape with its latter end greater in outside diameter than its former end, and buckling radially outwardly upon receiving a compressive force from the vessel thereby absorbing the impact of the vessel; and a step formed along an outer periphery of a connection portion between the two bumper members, the step defined by the former end of the second bumper member having a greater outside diameter than the latter end of the first bumper member.

By virtue of a step 14 on the outer periphery of the connection portion between two bumper members 11, 12, such as shown in FIGS. 1 and 2A for example, the fender of claim 1 can accomplish the increase in the aforesaid distortion D, as compared with the conventional fender 9 without the step on the outer periphery of the connection portion CP. Specifically, the provision of the step 14 provides a configuration wherein an outer periphery 11a of the first bumper member 11 is somewhat recessed from an outer periphery 12a of the second bumper member 12. As a result, when the fender is buckled, a greater distortion D than in the conventional fender 9 is involved in bringing the outer peripheries 12a, 12a into contact with each other, as shown in FIG. 2B.

As shown in FIG. 20B, the conventional fender 9 in the buckled state contains a cavity CV between the bent bumper members 91, 92. The cavity CV is responsible for a greater decline of the reaction force after Maximum Point A. That is, a deformation involved in crushing the cavity CV is added to the normal deformation by buckling as mentioned supra, so that the fender 9 encounters the correspondingly increased amount of deformation after buckling. This results in the greater decline of the reaction force after Maximum Point A. In contrast, the arrangement of claim 1 is adapted to reduce or totally eliminate the cavity between the bent members 11, 12 by virtue of a corner of the step 14 caught in the cavity, as shown in FIG. 2B. Thus, the decline of the reaction force after Maximum Point A is reduced.

According to the arrangement of claim 1, the synergy between these effects not only approximates the characteristic curve as close as possible to the idealistic curve but also enables further increase in the energy-absorption capacity and the energy absorption efficiency of the fender.

According to the invention of claim 2, the fender of claim 1 is characterized in that the first bumper member and the second bumper member share the same inside diameter at the connection portion and that a ratio $T_1/T_2$ is in the range of 0.8 to 0.9, $T_1$ denoting a thickness of the first bumper member, $T_2$ denoting a thickness of the second bumper member.

If the ratio $T_1/T_2$ is less than 0.8, the thickness $T_2$ of the second bumper member 12 is relatively increased.

This may result in a similar problem to that occurred in the case of FIGS. 22A, 22B. Specifically, areas 12b, 12c above and below the buckling position BP on an inner periphery of the second bumper member 12 are brought into contact with each other by a smaller distortion and hence, the allowed distortion D is decreased. This leads to a reduced energy-absorption capacity after buckling.

If the ratio $T_1/T_2$ exceeds 0.9, the step 14 may have an insufficient dimension for adequately offering the effect of claim 1. Specifically, when caught in the cavity between the bent of the first and second bumper members 11, 12, the step 14 may not be effective enough to reduce or totally eliminate the cavity. Thus, the decline of the reaction force after Maximum Point A cannot be reduced enough. Or the step 14 may not be effective enough to increase the distortion involved in bringing the outer peripheries 11a, 12a of the bumper members 11, 12 into contact with each other. Thus, the distortion D cannot be increased enough.

In contrast, the arrangement of claim 2 is not likely to encounter these problems, further enhancing the effects of claim 1.

According to the invention of claim 3, the fender of claim 1 is characterized in that a ratio $H_1/H_0$ is in the range of 0.1 to 0.3, $H_1$ denoting an axial height of the cylindrical body of the first bumper member, $H_0$ denoting an overall height of the fender with respect to the axis of the cylindrical body.

According to the invention of claim 4, the fender of claim 3 is characterized in that an angle $\theta_1$ between the fixing surface and a generatrix of the conical body of the second bumper member is in the range of 70 to 80°.

If the overall height $H_0$ and the outside diameter $D_1$ of the first bumper member 11 are constant, the height $H_1$ and the angle $\theta_1$ have a correlation. That is, as the height $H_1$ of the first bumper member 11 accounts for the greater proportion of the overall height $H_0$, the angle $\theta_1$ becomes the smaller, as shown in FIG. 8. On the other hand, the angle $\theta_1$ increases with decrease in the proportion of the height $H_1$ as shown in FIG. 9.

If the height $H_1$ is below the above range or if the angle $\theta_1$ exceeds the above range, the reaction force at buckling is increased because the height $H_2$ of the second bumper member 12 has a relatively increased proportion of the overall height $H_0$. At the same time, the energy-absorption capacity as a whole is increased because the distortion of the fender involved in bringing the second bumper member 12 into a buckling process or the distortion thereof involved in buckling the second bumper member to limit is increased. Considering the characteristics of the fender, however, such a fender cannot serve a useful function because a width of a constant load area, that is, a range of the characteristic curve between Maximum Point A and the point B where the first bumper member 11 is in charge of the load is too small.

If the height $H_1$ exceeds the above range or if the angle $\theta_1$ is below the above range, the reaction force at buckling is decreased because the height $H_2$ of the second bumper member 12 has a relatively decreased proportion of the overall height $H_0$. At the same time, the distortion of the fender involved in bringing the second bumper member 12 into the buckling process or the distortion thereof involved in buckling the second bumper member to limit is decreased. Hence, the energy-absorption capacity as a whole tends to decrease.

In contrast, the arrangements of claims 3 and 4 are not likely to encounter these problems, further enhancing the effects of claim 1.

According to the invention of claim 5, a fender for absorbing the impact of a vessel, formed of rubber and fixed to a fixing surface of a dock as having an impact receiving plate secured to a distal end of its body, the fender comprises: a first bumper member formed in a cylindrical shape of a constant outside diameter and defining at one end of the cylindrical body thereof a fixing portion for the impact receiving plate; a second bumper member connected at one end to the other end of the cylindrical body of the first bumper member, defining at the other end thereof a fix portion to be fixed to the fixing surface, formed in a hollow conical shape with its latter end greater in outside diameter than its former end, and buckling radially outwardly upon receiving a compressive force from the vessel thereby absorbing the impact of the vessel; and a projection having a constant width and formed along a buckling position on an inner periphery of the second bumper member.

According to the arrangement of claim 5, the second bumper member 12 is buckled and clamp a projection 15 from top and bottom, as shown in FIG. 4C while the clamped projection 15 develops a counterforce against a compressive force applied thereto by being buckled. That is, the projection 15 contributes the counterforce against the buckling of the second bumper member 12. This results in an increased reaction force which the buckled second bumper member 12 exhibits against the compressive force.

On the inner periphery of the second bumper member 12, the areas 12b, 12c above and below the projection 15 are in somewhat recessed from the projection 15. This also results in an increased distortion of the buckled fender which is involved in bringing the areas 12b, 12c into contact with each other.

Thus, the synergy between these effects increases the energy-absorption capacity of the fender as a whole.

According to the invention of claim 6, the fender of claim 5 is characterized in that a ratio $W_1/W_2$ is in the range of 3/6 to 6/3, $W_1$ denoting a distance from the buckling position to an upper side of the projection along an axis of the conical body of the second bumper member, $W_2$ denoting a distance from the buckling position to a lower side of the projection along the axis of the conical body.

If the ratio $W_1/W_2$ is less than 3/6, the upper side of the projection 15 is so close to the buckling position BP of the second bumper member 12 that the second bumper member 12 buckles only along the upper side of the projection 15 as shown in FIG. 12C for example. If the ratio $W_1/W_2$ is in excess of 6/3, the lower side of the projection 15 is so close to the buckling position BP of the second bumper member 12 that the second bumper member 12 buckles only along the lower side of the projection 15 as shown in FIG. 13C for example. In either cases, the buckled second bumper member 12 cannot clamp the projection 15 from top and bottom well, thus, the effect of claim 5 may not be fully attained.

In contrast, the arrangement of claim 6 is not likely to encounter these problems, further enhancing the effects of claim 5.

According to the invention of claim 7, the fender of claim 6 is characterized in that a distance $W_1+W_2$ between the upper side and the lower side of the projection along the axis of the conical body is in the range of 20 to 40% of a height $H_2$ of the second bumper member along the axis of the conical body.

If the distance $W_1+W_2$ representative of the width of the projection 15 is less than 20% of the height $H_2$, the projection 15 may not provide the adequate effects of claim 5. Specifically, the projection 15 may be too small to afford the aforesaid effect to increase the reaction force of the second bumper member 12 as it is buckled. If the distance $W_1+W_2$ is in excess of 40% of the height $H_2$, a similar result to that of the increased thickness of the whole body of the second bumper member 12 is produced. This leads to the same problem as in the case of FIGS. 22A, 22B, decreasing the energy-absorption capacity after buckling.

In contrast, the arrangement of claim 7 is not likely to encounter these problems, further enhancing the effects of claim 5.

According to the invention of claim 8, the fender of claim 7 is characterized in that the projection is of a trapezoidal shape in section and has a projection height $T_3$ from the inner periphery of the second bumper member in the range of 5 to 15% of the thickness $T_2$ of the second bumper member.

If the height $T_3$ of the projection 15 of the trapezoidal sectional shape is less than 5% of the thickness $T_2$ of the second bumper member, the projection 15 may be too low to afford an adequate effect to increase the reaction force of the second bumper member 12 as it is buckled. It is also likely that the projection 15 is not effective enough to increase the distortion of the buckled fender involved in bringing the areas 12b, 12c above and below the projection 15 into contact with each other. That is, the provision of the projection 15 may not contribute the adequate effect. If the height $T_3$ of the projection 15 exceeds 15% of the thickness $T_2$ of the second bumper member, an excessive distortion of the fender may be involved in bringing the areas 12b, 12c into contact with each other, the areas 12b, 12c located above and below the projection 15 on the inner periphery of the second bumper member 12. As a result, the fender is excessively distorted when both the areas 12b, 12c contact each other so that the reaction force rises sharply after this point of time, i.e., after the point C on the reaction force characteristic curve. That is, the fender is excessively compressed so that damage to the vessel or the fender itself may result.

In contrast, the arrangement of claim 8 is not likely to encounter these problems, further enhancing the effects of claim 5.

According to the invention of claim 9, the fender of claim 7 is characterized in that the projection is of a triangular shape in section and has a projection height $T_3$ from the inner periphery of the second bumper member in the range of 15 to 20% of the thickness $T_2$ of the second bumper member. Given the same width and height, the projection 15 of the triangular sectional shape has a smaller sectional area than the projection of the trapezoidal sectional shape. Accordingly, the projection is designed to have a greater projection height $T_3$ in order to accomplish the same degree of working effect as the projection of the trapezoidal sectional shape.

If the projection of the triangular sectional shape has a projection height $T_3$ of less than 15% of the thickness $T_2$ of the second bumper member 12, the projection 15 may be too low to afford an adequate effect to increase the reaction force of the second bumper member 12 as it is buckled. It is also likely that the projection 15 is not effective enough to increase the distortion of the buckled fender involved in bringing the areas 12b, 12c above and below the projection 15 into contact with each other. That is, the provision of the projection may not contribute the adequate effect. If the height $T_3$ of the projection 15 exceeds 20% of the thickness $T_2$ of the second bumper member, an excessive distortion of the fender may be involved in bringing the areas 12b, 12c into contact with each other, the areas 12b, 12c located above and below the projection 15 on the inner periphery of the second bumper member 12. The fender is excessively distorted when both the areas 12b, 12c contact each other so that the reaction force rises sharply after this point of time, i.e., after the point C on the reaction force characteristic curve. That is, the fender is excessively compressed so that damage to the vessel or the fender itself may result.

In contrast, the arrangement of claim 9 is not likely to encounter these problems, further enhancing the effects of claim 5.

According to the invention of claim 10, the fender of claim 5 further comprises a step along an outer periphery of a connection portion between the two bumper members, the step defined by the former end of the second bumper member having a greater outside diameter than the latter end of the first bumper member.

According to the arrangement of claim 10, the synergy between the effects of the arrangements of claims 1 and 5 not only provides the characteristic curve even closer to the idealistic curve but also enables further increase in the energy-absorption capacity and the energy absorption efficiency of the fender.

An analogous arrangement to the inventive arrangement is disclosed in Japanese Unexamined Patent Publication No.11(1999)-222833 which suggests the provision of a step on an outer periphery of a circle-type fender. However, this step is not provided at the connection portion between the first and the second bumper members but at a midportion of the second bumper member, which is far below the connection portion. Disposed at such a place, the step does not operate the same way as the aforementioned step of the invention. Therefore, the above fender cannot offer the working effect equivalent to that of the invention. Hence, this prior art is not construed as disclosing nor suggesting the present invention.

Japanese Unexamined Patent Publication No.7(1995)-229129 discloses a circle-type fender provided with a projection on its inner periphery. However, the projection is not disposed on the buckling position of the fender, as shown in FIG. 8, contained in this official gazette. The projection is disposed in a manner that the buckling position is positioned on a boundary between the projection and a smaller-thickness portion adjoining thereto. Therefore, this fender is no more than an equivalent to the aforementioned comparative examples of FIGS. 12A–12C and 13A–13C, being unable to offer the same working effect as the invention. Hence, this prior art is not construed as disclosing nor suggesting the present invention.

Further, Japanese Examined Utility Publication No.49 (1974)-15516 discloses a fender, the whole body of which is formed in a cylindrical shape of a constant outside diameter. This prior-art fender has an arrangement wherein the cylindrical body is formed with a projection at its buckling position. However, this prior art never teaches that the whole body of the fender consists of a first cylindrical bumper member of a constant outside diameter and a second bumper member of a hollow conical shape, nor that the projection is disposed on the buckling position of the second bumper member. Hence, this prior art is not construed as disclosing nor suggesting the present invention.

BRIEF DESCRIPTION OF THE DRAWINGS

FIG. 2A is a vertical sectional view showing the fender of FIG. 1 in a normal, uncompressed state, whereas

FIG. 6A is a vertical sectional view showing a fender according to another embodiment of the invention in a normal, uncompressed state, whereas

FIG. 7A is a vertical sectional view showing a fender of Example 2 in a normal, uncompressed state whereas

FIG. 8A is a vertical sectional view showing a fender of Example 3 in a normal, uncompressed state whereas

FIG. 9A is a vertical sectional view showing a fender of Example 4 in a normal, uncompressed state whereas

FIG. 10A is a vertical sectional view showing a fender of Comparative Example 2 in a normal, uncompressed state whereas

FIG. 15A is a vertical sectional view showing a fender of Example 8 in a normal, uncompressed state whereas

FIG. 16A is a vertical sectional view showing a fender of Example 9 in a normal, uncompressed state whereas

FIG. 17A is a vertical sectional view showing a fender of Example 10 in a normal, uncompressed state whereas

FIG. 18A is a vertical sectional view showing a fender of Comparative Example 6 in a normal, uncompressed state whereas

FIG. 20A is a vertical sectional view showing a conventional fender in a normal, uncompressed state whereas

FIG. 22A is a vertical sectional view showing another conventional fender in a normal, uncompressed state whereas

DESCRIPTION OF PREFERRED EMBODIMENTS

Figure 1:
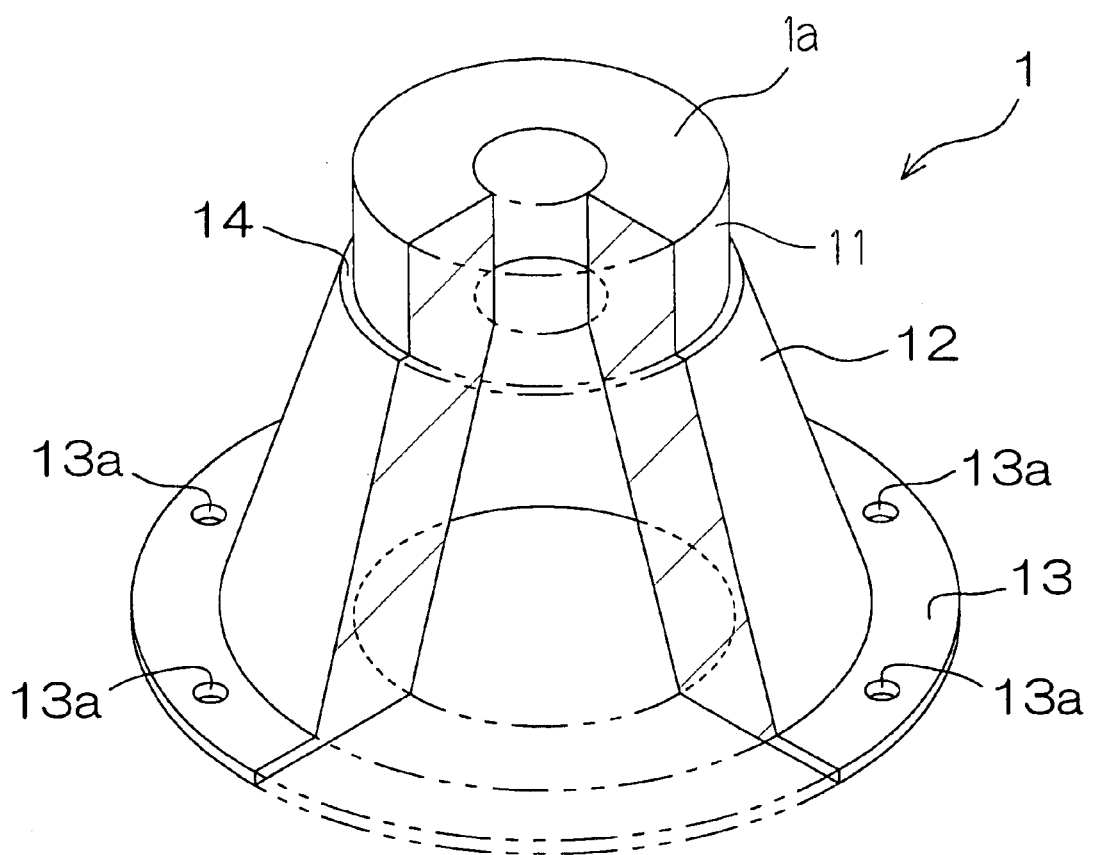
FIG. 1 is a partially cutaway perspective view showing a fender according to one embodiment of the invention.
Figure 2A:
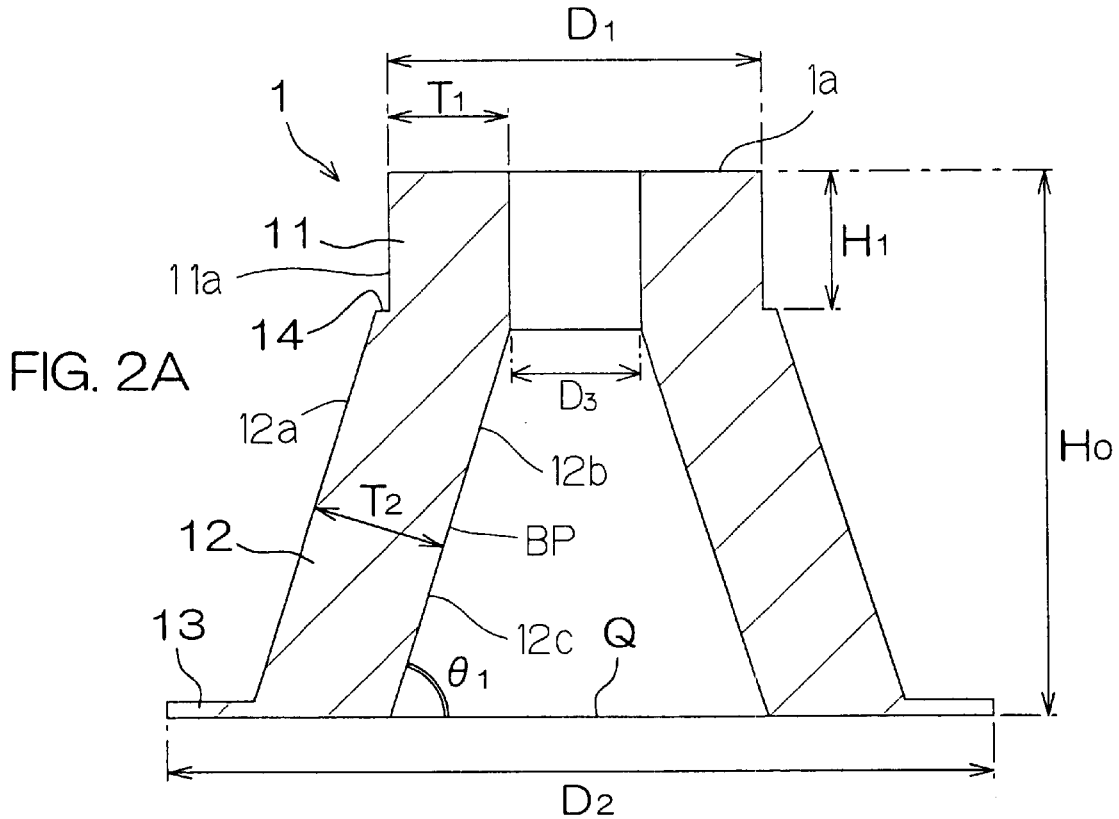
Figure 2B:
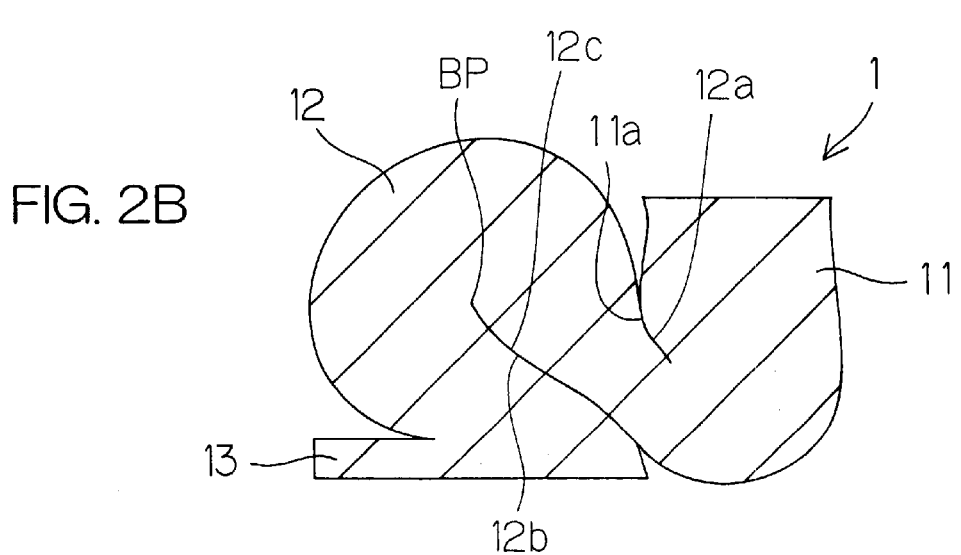
FIG. 2B is an enlarged vertical sectional view showing the fender compressed into a buckled state.

FIG. 1 is a partially cutaway perspective view showing a fender 1 according to one embodiment of the invention. FIG. 2A is a vertical sectional view of the above fender 1.

The fender 1 comprises:

a first bumper member 11 formed in a cylindrical shape of a constant outside diameter $D_1$, one end of the cylindrical body defining a distal end 1a of the fender 1 and serving as a fixing portion for an impact receiving plate (not shown) directly coming into contact with a vessel;

a second bumper member 12 connected at one end to the other end of the cylindrical body of the first bumper member 11, defining at the other end thereof a fix portion to be fixed to a fixing surface Q of a dock, and formed in a hollow conical shape with its latter end greater in outside diameter than its former end; and a step 14 formed along an outer periphery of a connection portion between the two bumper members and defined by the former end of the second bumper member 12 having a greater outside diameter than the latter end of the first bumper member 11. Indicated at 13 is a flange actually functioning to secure the fix portion of the second bumper member 12 to the fixing surface Q. The flange 13 is formed with through holes 13a penetrated by fixing bolts (not shown). Although not illustrated, the flange 13 may have a reinforcement member, such as of a steel plate, embedded therein for the reinforcement purpose. Further, the first bumper member 11 may have a reinforcement member, such as of a steel plate, embedded in the former end thereof, i.e., the distal end 1a of the fender 1 for the purposes of reinforcement and mounting of the impact receiving plate.

The first bumper member 11 and the second bumper member 12 are designed to share the same inside diameter $D_3$ at the connection portion. In this design, a ratio $T_1/T_2$ between a thickness $T_1$ of the first bumper member 11 and a thickness $T_2$ of the second bumper member 12 is preferably in the range of 0.8 to 0.9, the ratio defining the width of the step 14. The reason for this is mentioned in the foregoing. In order to further enhance the aforesaid working effect of the step 14, the step of the wider width is more preferred. That is, the ratio $T_1/T_2$ closer to 0.8 is more preferred.

A ratio $H_1/H_0$ between a height $H_1$ of the first bumper member 11 and an overall height $H_0$ of the fender 1, which is equal to a combined height of the first and the second bumper members 11, 12, is preferably in the range of 0.1 to 0.3. An angle $\theta_1$ between a generatrix of the cone of the second bumper member 12 and the fixing surface Q is preferably in the range of 70 to 80°. The reasons for this are also mentioned in the foregoing. The ratio $H_1/H_0$ ranging from 0.22 to 0.27 and the angle $\theta_1$ ranging from 70 to 75° are more preferred in the light of a more preferred fender featuring a suitable reaction force characteristic as a useful fender and a great energy absorption.

The fender 1 is fabricated as follows. A mold is charged with an unvulcanized rubber compound and a plate-like reinforcement member to be embedded in one end of the first bumper member 11 and in the flange, as required. The mold has a shape corresponding to the shape of the fender 1. The rubber compound is heated under pressure for vulcanization.

Figure 3:
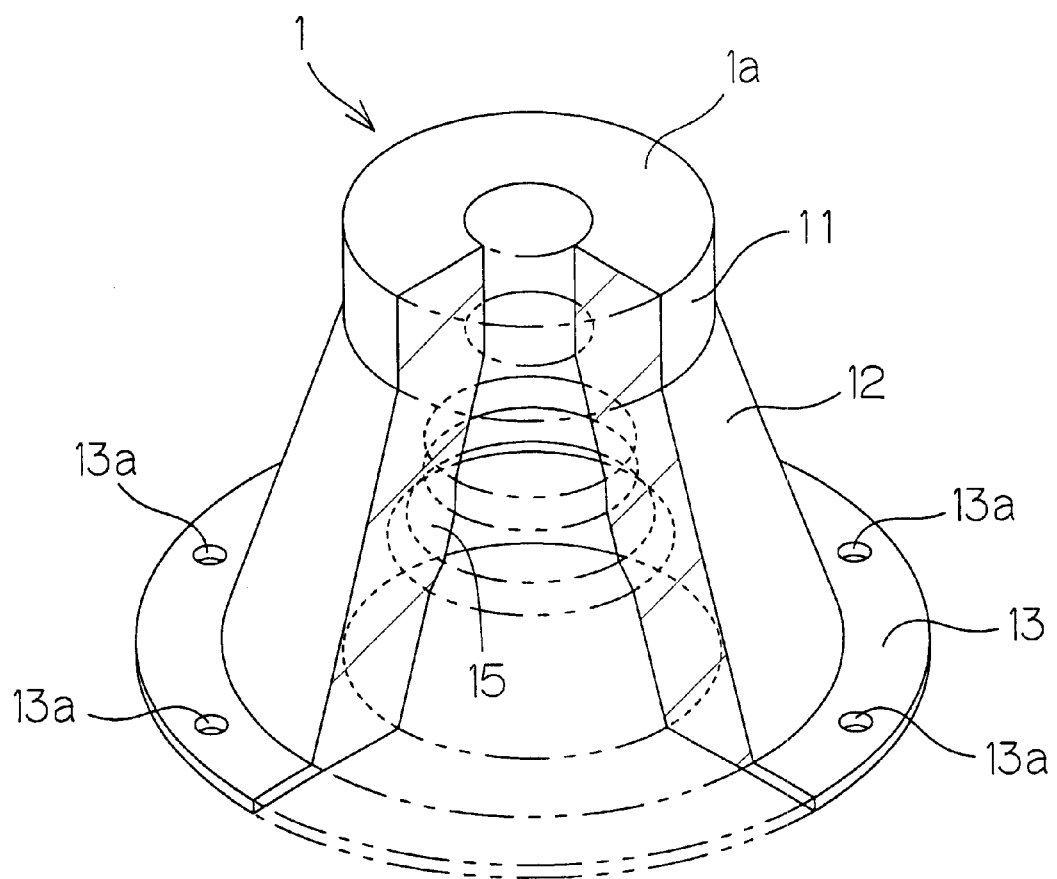
FIG. 3 is a partially cutaway perspective view showing a fender according to another embodiment of the invention.
Figure 4A:
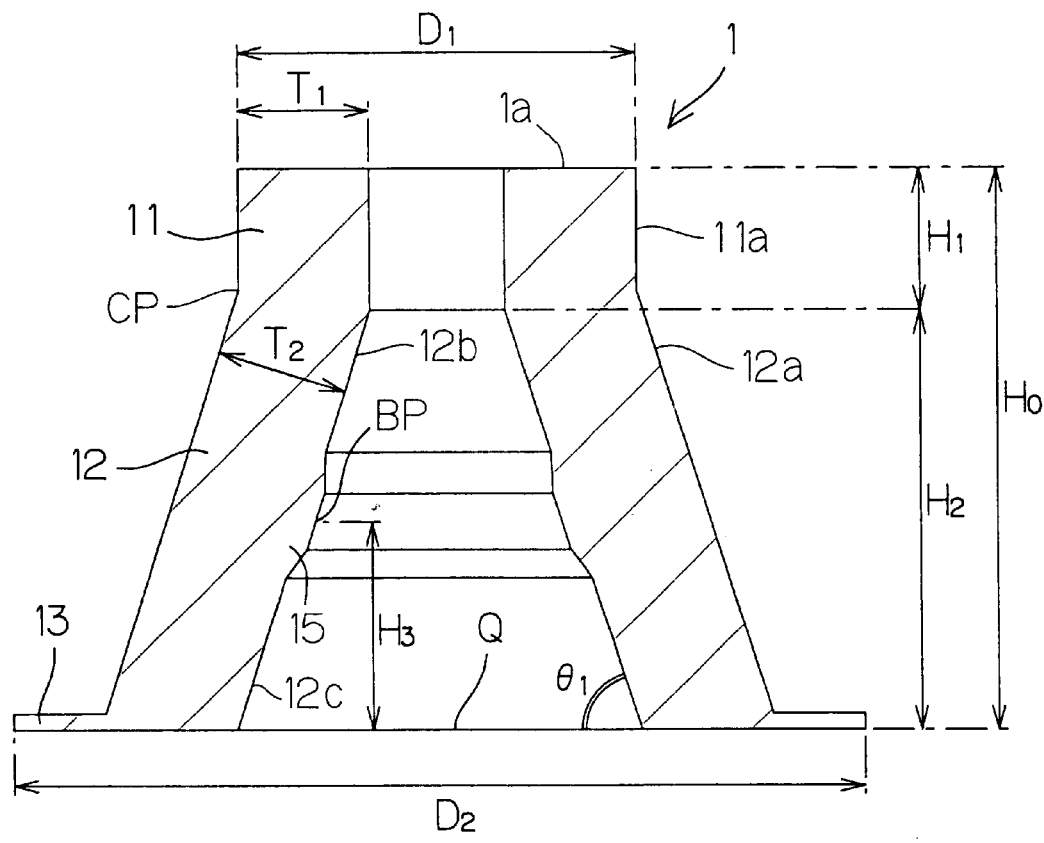
FIG. 4A is a vertical sectional view showing the fender of FIG. 3 in a normal, uncompressed state.
Figure 4B:
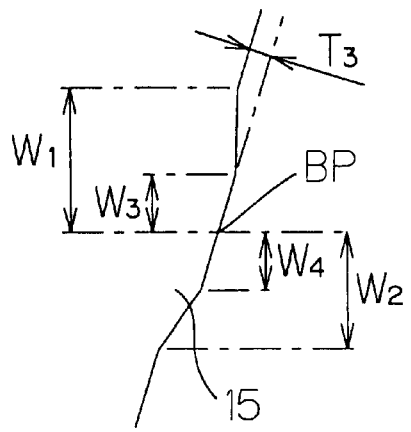
FIG. 4B is an enlarged sectional view showing a projection which is a principal part of the fender.

FIG. 3 is a partially cutaway perspective view showing a fender 1 according to another embodiment of the invention. FIG. 4A is a vertical sectional view of the above fender 1 whereas FIG. 4B is an enlarged sectional view of a projection 15 which is a principal part of the fender 1.

The fender 1 comprises:

a first bumper member 11 formed in a cylindrical shape of a constant outside diameter $D_1$, one end of the cylindrical body defining a distal end 1a of the fender 1 and serving as a fixing portion for an impact receiving plate (not shown) directly coming into contact with a vessel;

a second bumper member 12 connected at one end to the other end of the cylindrical body of the first bumper member 11, defining at the other end thereof a fix portion to be fixed to a fixing surface Q of a dock, and formed in a hollow conical shape with its latter end greater in outside diameter than its former end; and a projection 15 having a constant width and formed along a buckling position BP on an inner periphery of the second bumper member 12. Similarly to the foregoing embodiment, the second bumper member 12 is provided with the flange 13 at its latter end for securing the fender to the fixing surface Q. The flange 13 is formed with the through holes 13a penetrated by the fixing bolts (not shown). Although not shown in the figure, the flange 13 may have the reinforcement member, such as of a steel plate, embedded therein for the reinforcement purpose. Further, the reinforcement member, such as of a steel plate, may also be embedded in the former end of the first bumper member 11, i.e., the distal end 1a of the fender 1 for the purposes of reinforcement and fixing of the impact receiving plate.

The projection 15 may preferably have a ratio $W_1/W_2$ in the range of 3/6 to 6/3, $W_1$ denoting a distance from the buckling position BP of the second bumper member 12 to an upper side of the projection 15, $W_2$ denoting a distance from the buckling position BP to a lower side of the projection 15. The ratio $W_1/W_2$ defines the position of the projection. A distance $W_1+W_2$ between the upper side and the lower side of the projection 15 is preferably in the range of 20 to 40% of the height $H_2$ of the second bumper member 12. The distance $W_1+W_2$ defines the width of the projection 15. The reasons for this are mentioned in the foregoing. In order to further enhance the aforesaid working effect of the projection 15, the ratio $W_1/W_2$ more preferably ranges from 4/5 to 5/4 and the distance $W_1+W_2$ more preferably ranges from 25 to 35% of the height $H_2$.

The projection 15 is formed in a trapezoidal shape in section. The projection 15 may preferably have a projection height $T_3$ from the inner periphery of the second bumper member 12 in the range of 5 to 15% of the thickness $T_2$ of the second bumper member 12. The reason for this is also mentioned in the foregoing. The projection height $T_3$ is more preferably in the range of 7 to 9% of the thickness $T_2$ from the standpoint of further enhancing the aforesaid working effect of the projection 15.

Figure 5A:
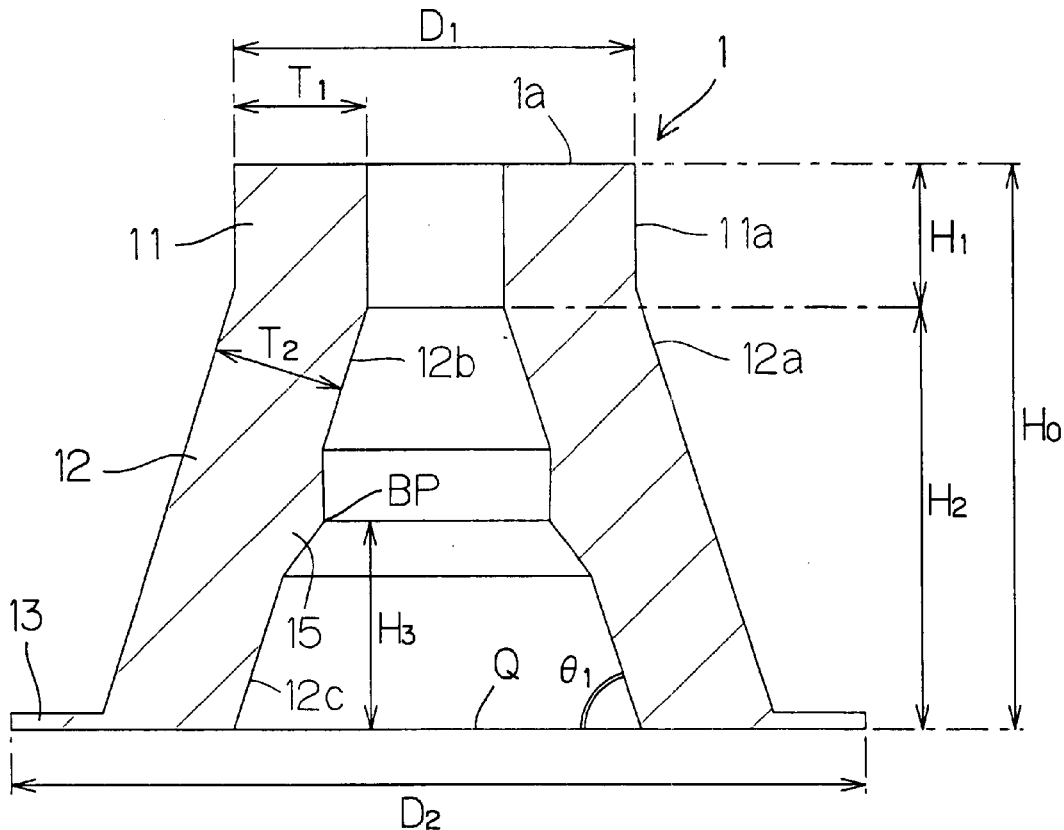
FIG. 5A is a vertical sectional view showing a fender according to another embodiment in a normal, uncompressed state.
Figure 5B:
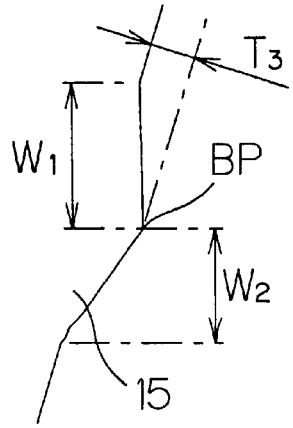
FIG. 5B is an enlarged sectional view showing a projection which is a principal part of the fender.

FIG. 5A is a vertical sectional view showing a fender 1 according to a still another embodiment of the invention. FIG. 5B is an enlarged sectional view of the projection 15 which is the principal part of the fender 1.

The fender of this embodiment differs from the arrangement of FIGS. 4A, 4B in that the projection has a triangular sectional shape rather than the trapezoidal shape. Other parts are the same as those of the foregoing embodiments and represented by the same reference characters, respectively.

The projection 15 with the triangular sectional shape may preferably have a projection height $T_3$ from the inner periphery of the second bumper member 12 in the range of 15 to 20% of the thickness $T_2$ of the second bumper member 12. The reason for this is also mentioned in the foregoing. The projection height $T_3$ is more preferably in the range of 16 to 18% of the thickness $T_2$ from the standpoint of positively preventing the damage to the vessel or to the fender itself and of further enhancing the aforesaid working effect of the projection 15.

Figure 6A:
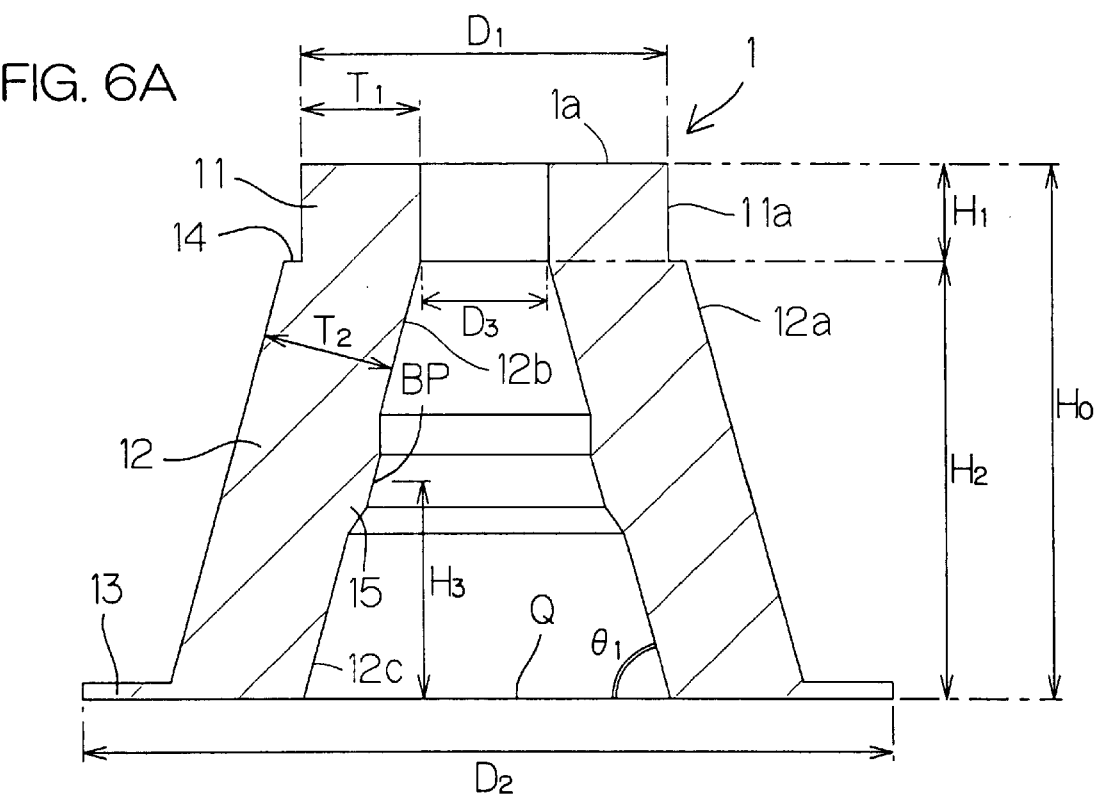
Figure 6B:
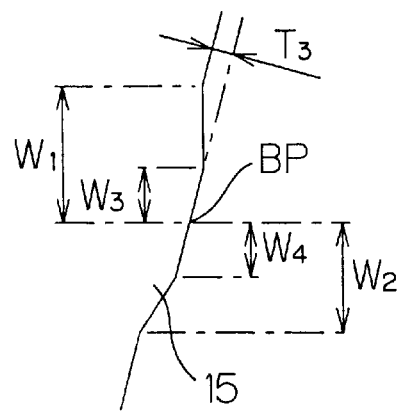
FIG. 6B is an enlarged sectional view showing a projection which is a principal part of the fender.

FIG. 6A is a vertical sectional view showing a fender 1 according to another embodiment of the invention. FIG. 6B is an enlarged sectional view showing a projection 15 which is the principal part of the fender 1.

The fender 1 of this embodiment is characterized by inclusion of both the step 14 and the projection 15. The synergistic effect of the two portions contributes a characteristic curve even closer to the ideal curve and further increases the energy-absorption capacity and the energy absorption efficiency of the fender. Other parts are the same as those of the forgoing embodiments and represented by the same reference characters, respectively.

It is preferred that the respective parts have the same dimensions, shapes and the like as those of the forgoing embodiments.

That is, the first and second bumper members 11, 12 are designed to share the same inside diameter $D_3$ at the connection portion between the two members 11, 12. In this design, the ratio $T_1/T_2$ between the thickness $T_1$ of the first bumper member 11 and the thickness $T_2$ of the second bumper member 12 is preferably in the range of 0.8 to 0.9, the ratio defining the width of the step 14. Particularly, the ratio closer to 0.8 is more preferred.

The ratio $H_1/H_0$ between the height $H_1$ of the first bumper member 11 and the overall height $H_0$ of the fender 1 is preferably in the range of 0.1 to 0.3 and more preferably of 0.22 to 0.27. The second bumper member 12 may have the angle $\theta_1$ between the generatrix of the cone body and the fixing surface Q preferably in the range of 70 to 8020 and more preferably of 70 to 75°.

The ratio $W_1/W_2$ between the distance $W_1$ from the buckling position BP of the second bumper member 12 to the upper side of the projection 15 and the distance $W_2$ from the buckling position BP to the lower side of the projection 15 is preferably in the range of 3/6 to 6/3, and more preferably of 4/5 to 5/4.

The distance $W_1+W_2$ between the upper side and the lower side of the projection 15 is preferably in the range of 20 to 40%, and more preferably of 25 to 35% of the height $H_2$ of the second bumper member 12.

The projection 15 is formed in a trapezoidal shape in section. The projection 15 may preferably have the projection height $T_3$ from the inner periphery of the second bumper member 12 in the range of 5 to 15% and more preferably of 7 to 9% of the thickness $T_2$ of the second bumper member 12.

The projection 15 may have a triangular sectional shape, the illustration of which is dispensed with. Such a projection 15 may have the projection height $T_3$ from the inner periphery of the second bumper member 12 in the range of 15 to 20% and more preferably of 16 to 18% of the thickness $T_2$ of the second bumper member 12.

It is to be noted that the arrangement of the fender of the invention is not limited to the embodiments described in the foregoing but various changes and modifications may be made thereto within the scope and spirits of the invention.

EXAMPLES

The invention will be described in more detail by way of reference to the following examples and comparative examples.

Example 1

A circle-type fender 1 was fabricated as follows. The following materials were charged in a mold and heated under pressure for vulcanizing a rubber base material. Thus was obtained the fender having the general appearance shown in FIG. 1 and the sectional shape shown in FIG. 2A as well as dimensions and an angle listed in Table 1.

A rubber compound: a rubber base material comprising a rubber mixture containing natural rubber and butadiene rubber in a weight ratio of 6:4;

A reinforcement member in one end of the first bumper member 11: a disk-like steel plate having a thickness of 28 mm and an outside diameter of 650 mm and including a through hole of inside diameter of 270 mm at its center; and A reinforcement member in the flange 13: a disk-like steel plate having a thickness of 28 mm and an outside diameter of 1470 mm and including a through hole of inside diameter of 710 mm at its center.

TABLE 1

| | |
|---|---|
| $T_1$ | 220 mm |
| $T_2$ | 244 mm |
| $T_1/T_1$ | 0.9 |
| $H_0$ | 1000 mm |
| $H_1$ | 250 mm |
| $H_1/H_0$ | 0.25 |
| $\theta_1$ | 72.5° |
| $D_1$ | 680 mm |
| $D_2$ | 1500 mm |

Example 2

Figure 7A:
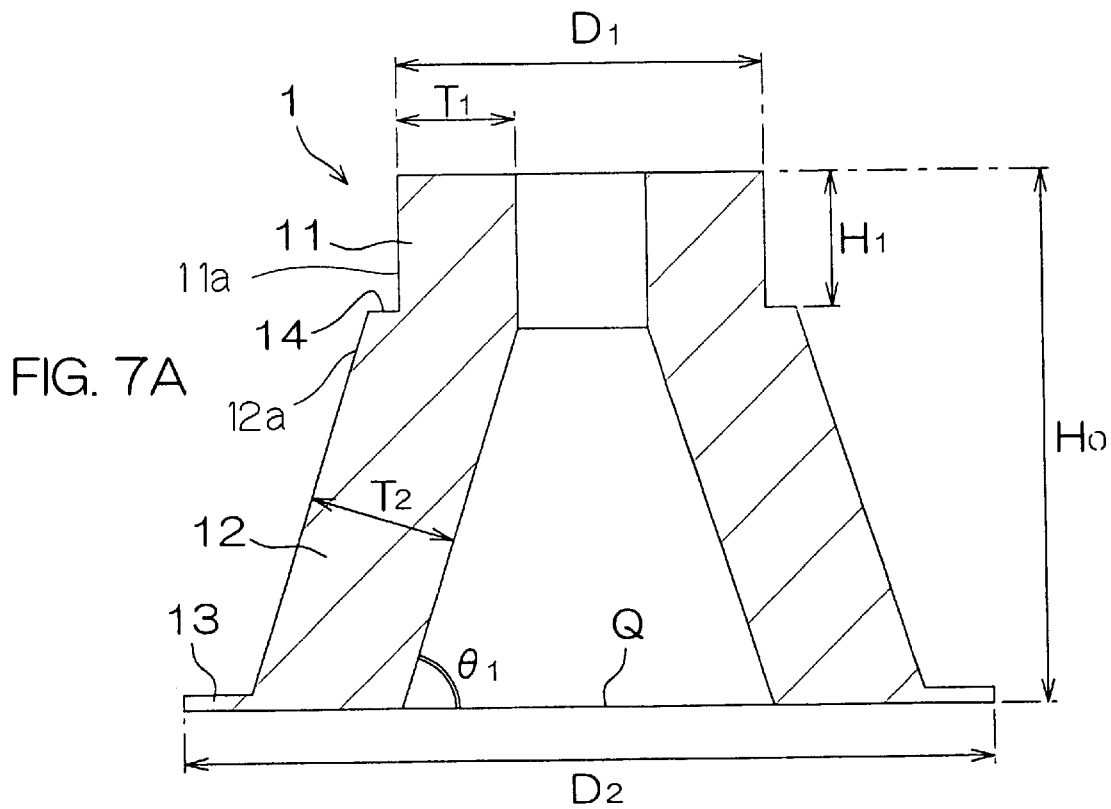
Figure 7B:
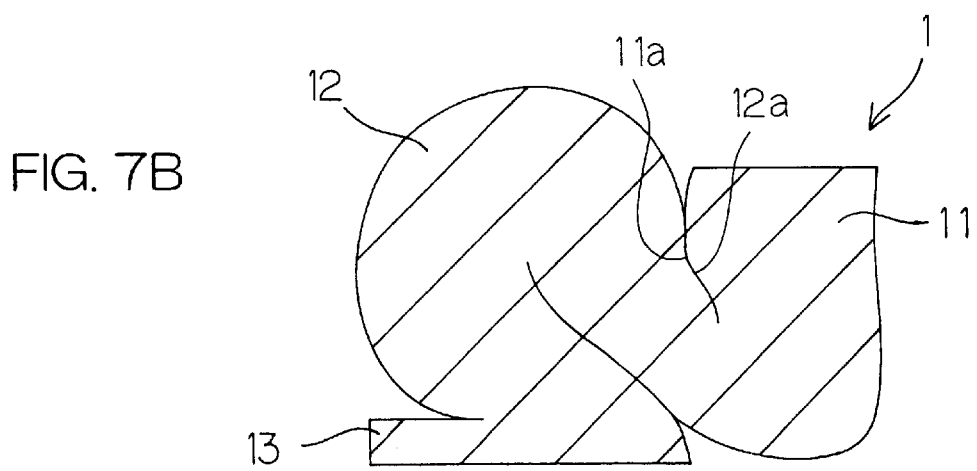
FIG. 7B is an enlarged vertical sectional view showing the fender compressed into a buckled state.

The same rubber compound and two types of reinforcement members as in Example 1 were used to fabricate a circle-type fender 1 having the sectional shape of FIG. 7A as well as dimensions and an angle listed in Table 2.

TABLE 2

| | |
|---|---|
| $T_1$ | 220 mm |
| $T_2$ | 275 mm |
| $T_1/T_2$ | 0.8 |
| $H_0$ | 1000 mm |
| $H_1$ | 250 mm |
| $H_1/H_0$ | 0.25 |
| $\theta_1$ | 72.5° |
| $D_1$ | 680 mm |
| $D_2$ | 1500 mm |

Example 3

Figure 8A:
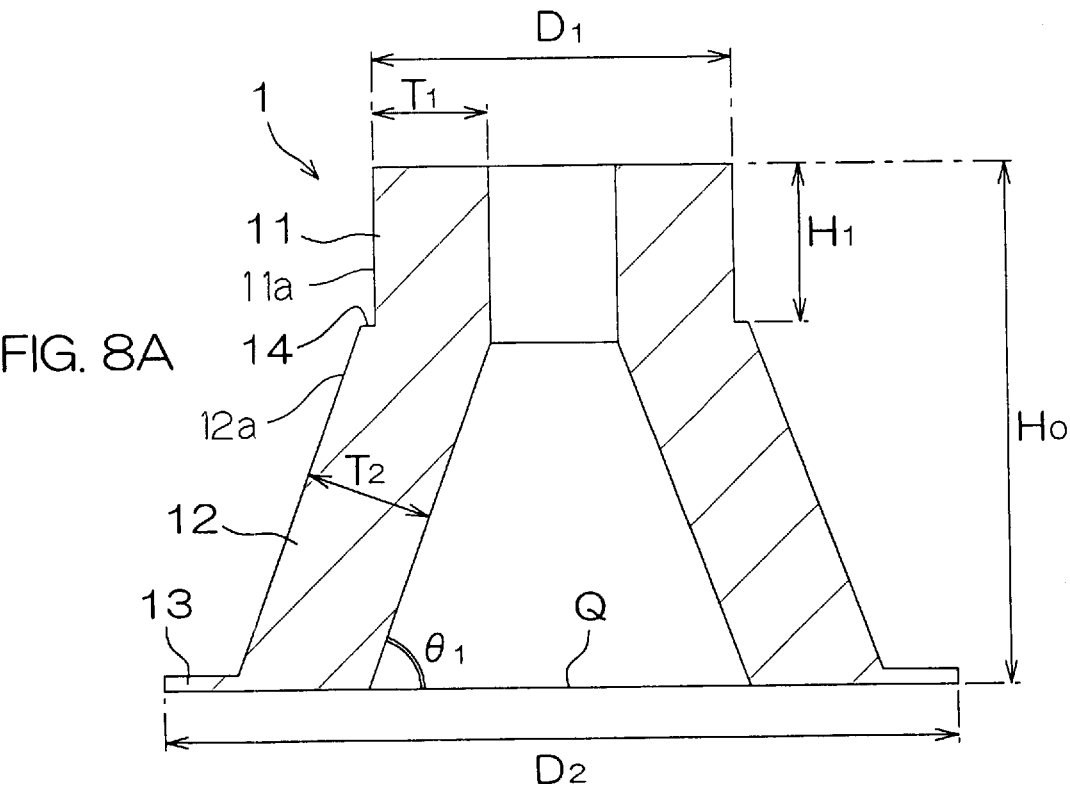
Figure 8B:
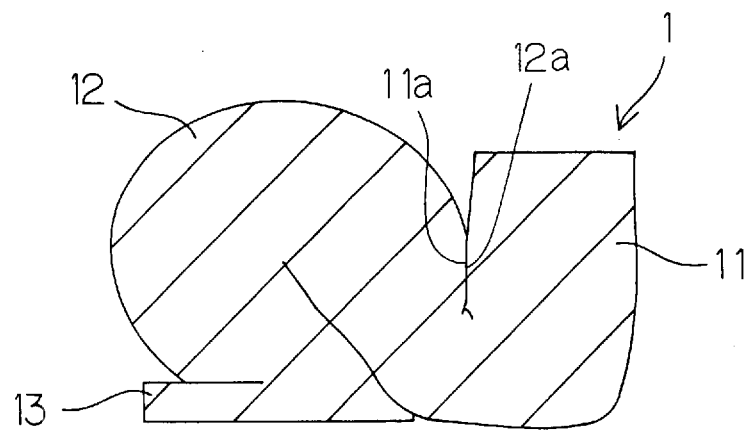
FIG. 8B is an enlarged vertical sectional view showing the fender compressed into a buckled state.

The same rubber compound and two types of reinforcement members as in Example 1 were used to fabricate a circle-type fender 1 having the sectional shape of FIG. 8A as well as dimensions and an angle listed in Table 3.

TABLE 3

| | |
|---|---|
| $T_1$ | 220 mm |
| $T_2$ | 244 mm |
| $T_1/T_2$ | 0.9 |
| $H_0$ | 1000 mm |
| $H_1$ | 300 mm |
| $H_1/H_0$ | 0.30 |
| $\theta_1$ | 70.0° |
| $D_1$ | 680 mm |
| $D_2$ | 1500 mm |

Example 4

Figure 9A:
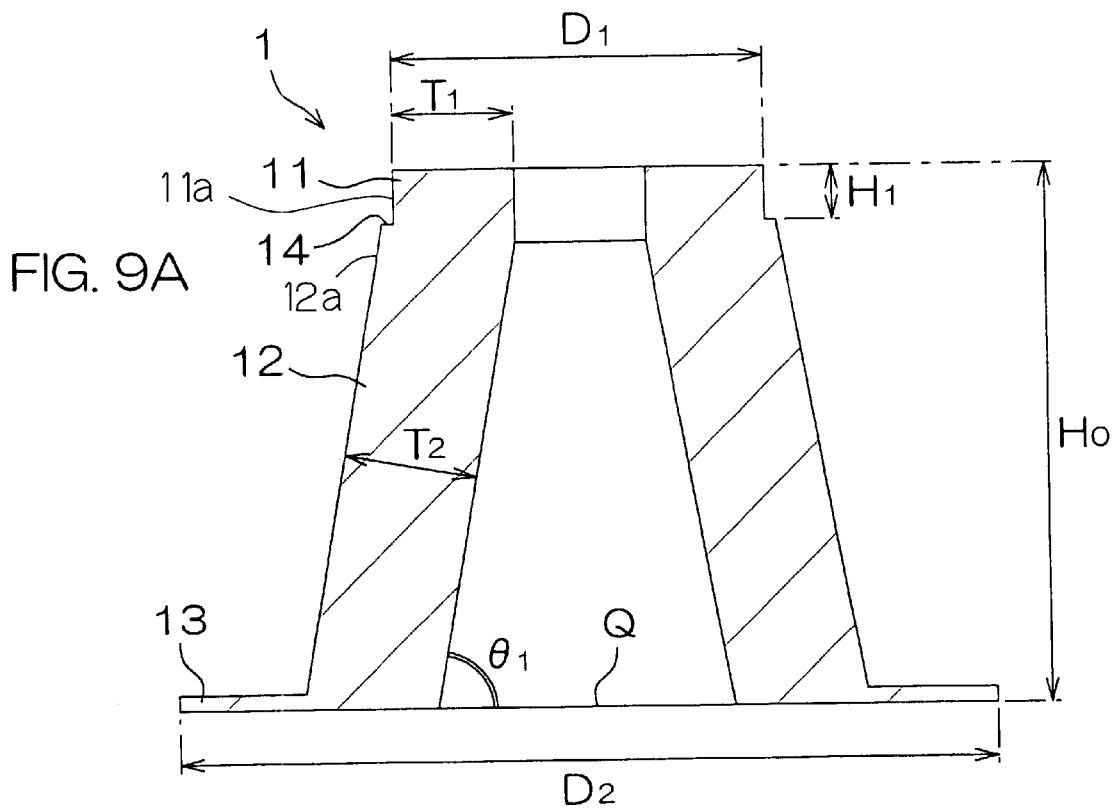
Figure 9B:
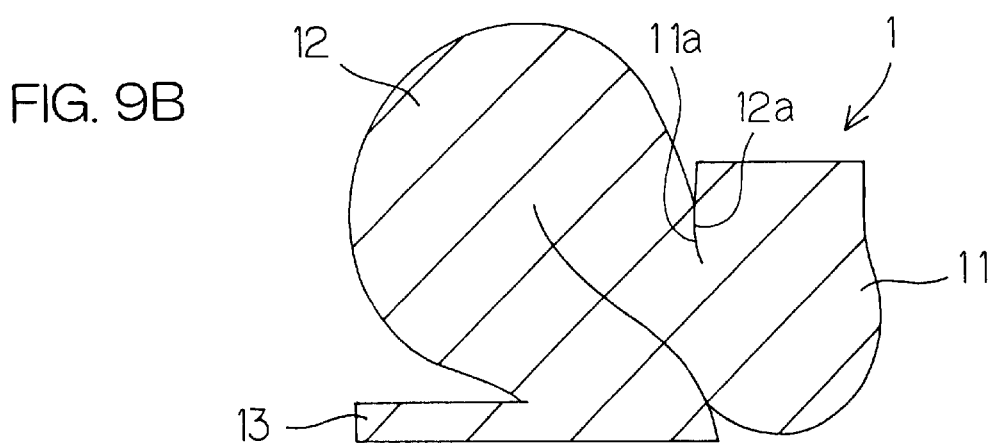
FIG. 9B is an enlarged vertical sectional view showing the fender compressed into a buckled state.

The same rubber compound and two types of reinforcement members as in Example 1 were used to fabricate a circle-type fender 1 having the sectional shape of FIG. 9A as well as dimensions and an angle listed in Table 4.

TABLE 4

| | |
|---|---|
| $T_1$ | 220 mm |
| $T_2$ | 244 mm |
| $T_1/T_2$ | 0.9 |
| $H_0$ | 1000 mm |
| $H_1$ | 100 mm |
| $H_1/H_0$ | 0.10 |
| $\theta_1$ | 80.0° |
| $D_1$ | 680 mm |
| $D_2$ | 1500 mm |

Comparative Example 1

Figure 20A:
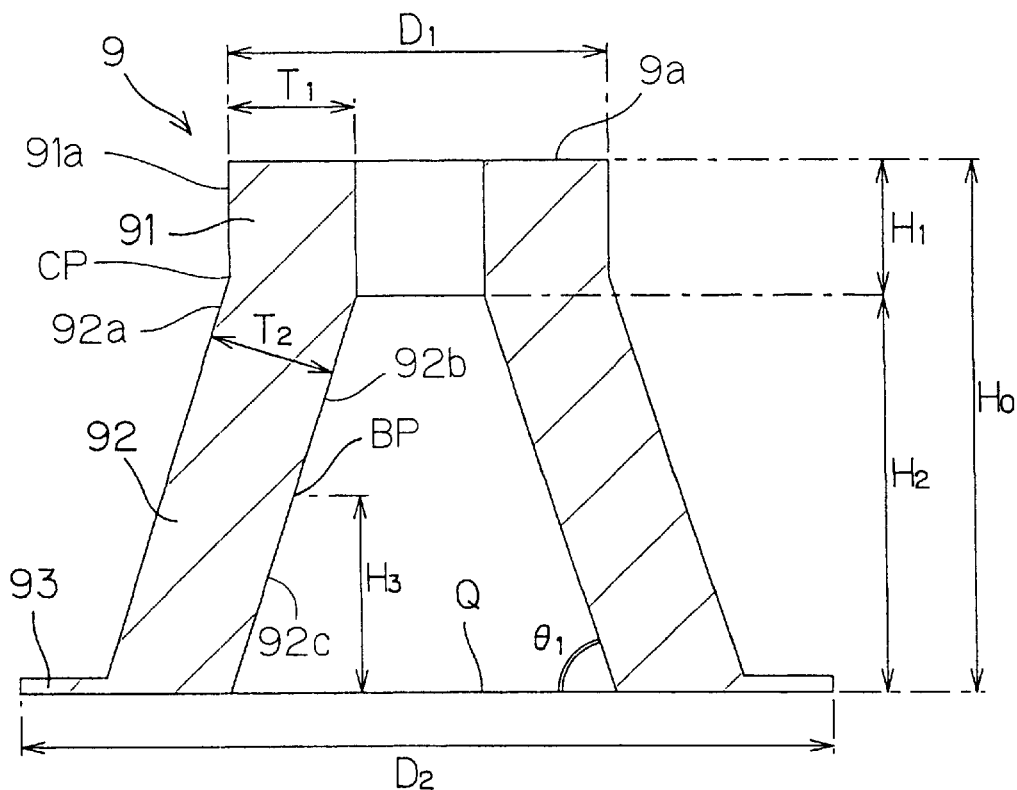

The same rubber compound as in Example 1 and the following two reinforcement members were used to fabricate a circle-type fender 1 having the conventional sectional shape shown in FIG. 20A as well as dimensions and an angle listed in Table 5.
A reinforcement member in one end of the first bumper member 11: a disk-like steel plate having a thickness of 28 mm and an outside diameter of 670 mm and including a through hole of inside diameter of 270 mm at its center; and
A reinforcement member in the flange 13: the same steel plate as in Example 1

TABLE 5

| | |
|---|---|
| $T_1$ | 230 mm |
| $T_2$ | 230 mm |
| $T_1/T_2$ | 1.0 |
| $H_0$ | 1000 mm |
| $H_1$ | 250 mm |
| $H_1/H_0$ | 0.25 |
| $\theta_1$ | 72.5° |
| $D_1$ | 700 mm |
| $D_2$ | 1500 mm |

Comparative Example 2

Figure 10A:
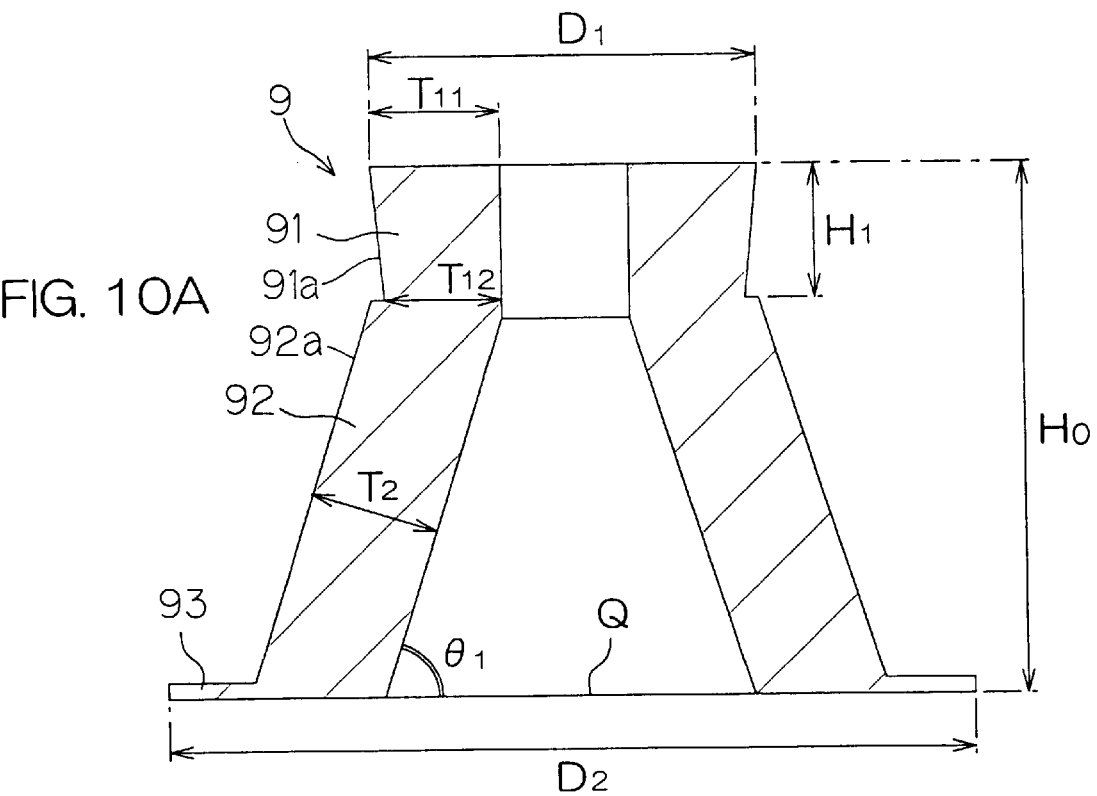

The same rubber compound as in Example 1 and the following two reinforcement members were used to fabricate a circle-type fender 1 having the sectional shape of FIG. 10A as well as dimensions and an angle listed in Table 6.
A reinforcement member in one end of the first bumper member 11: a disk-like steel plate having a thickness of 28 mm and an outside diameter of 690 mm and including a through hole of inside diameter of 270 mm at its center; and
A reinforcement member in the flange 13: the same steel plate as in Example 1

TABLE 6

| | |
|---|---|
| $T_{11}$ | 240 mm |
| $T_{12}$ | 216 mm |
| $T_2$ | 240 mm |
| $T_{11}/T_2$ | 1.0 |
| $T_{12}/T_2$ | 0.9 |
| $H_0$ | 1000 mm |
| $H_1$ | 250 mm |
| $H_1/H_0$ | 0.25 |
| $\theta_1$ | 72.5° |
| $D_1$ | 720 mm |
| $D_2$ | 1500 mm |

Table 7 tabulates principal dimensions of the above examples and comparative examples.

TABLE 7

| | Thickness(mm) | | | Height(mm) $H_0 = 1000$ | | Angle $\theta_1$ |
|---|---|---|---|---|---|---|
| | $T_1$ | $T_2$ | $T_1/T_2$ | $H_1$ | $H_1/H_0$ | (degree) |
| Ex.1 | 220 | 244 | 0.9 | 250 | 0.25 | 72.5 |
| Ex.2 | 220 | 275 | 0.8 | 250 | 0.25 | 72.5 |
| Ex.3 | 220 | 244 | 0.9 | 300 | 0.30 | 70.0 |
| Ex.4 | 220 | 244 | 0.9 | 100 | 0.10 | 80.0 |
| C.Ex.1 | 230 | 230 | 1.0 | 250 | 0.25 | 72.5 |
| C.Ex.2 | $T_{11}$: 240 $T_{12}$: 216 | 240 | 1.0 0.9 | 250 | 0.25 | 72.5 |

Compressive Test

The fenders of the above examples and comparative examples were each examined as follows. The former end of the first bumper member was mounted to a movable head of a 500 ton hydraulic press via a spacer analogous to the impact receiving plate, the spacer having the same diameter as the first bumper member and a thickness of 200 mm. The flange on the latter end of the second bumper member was fixed to a stationary head of the hydraulic press. The fender was compressed by the hydraulic press to determine the distortion (compressibility)-reaction force characteristic. The compressibility was determined by the following expression:

$$\text{Compressibility }(\%)=(H_0-H_0')/H_0\times 100$$

where $H_0$ denotes the overall height of the fender in initial shape and $H_0'$ denotes the overall height of the compressed fender. The results are shown in the graph of FIG. 11.

Figure 11:
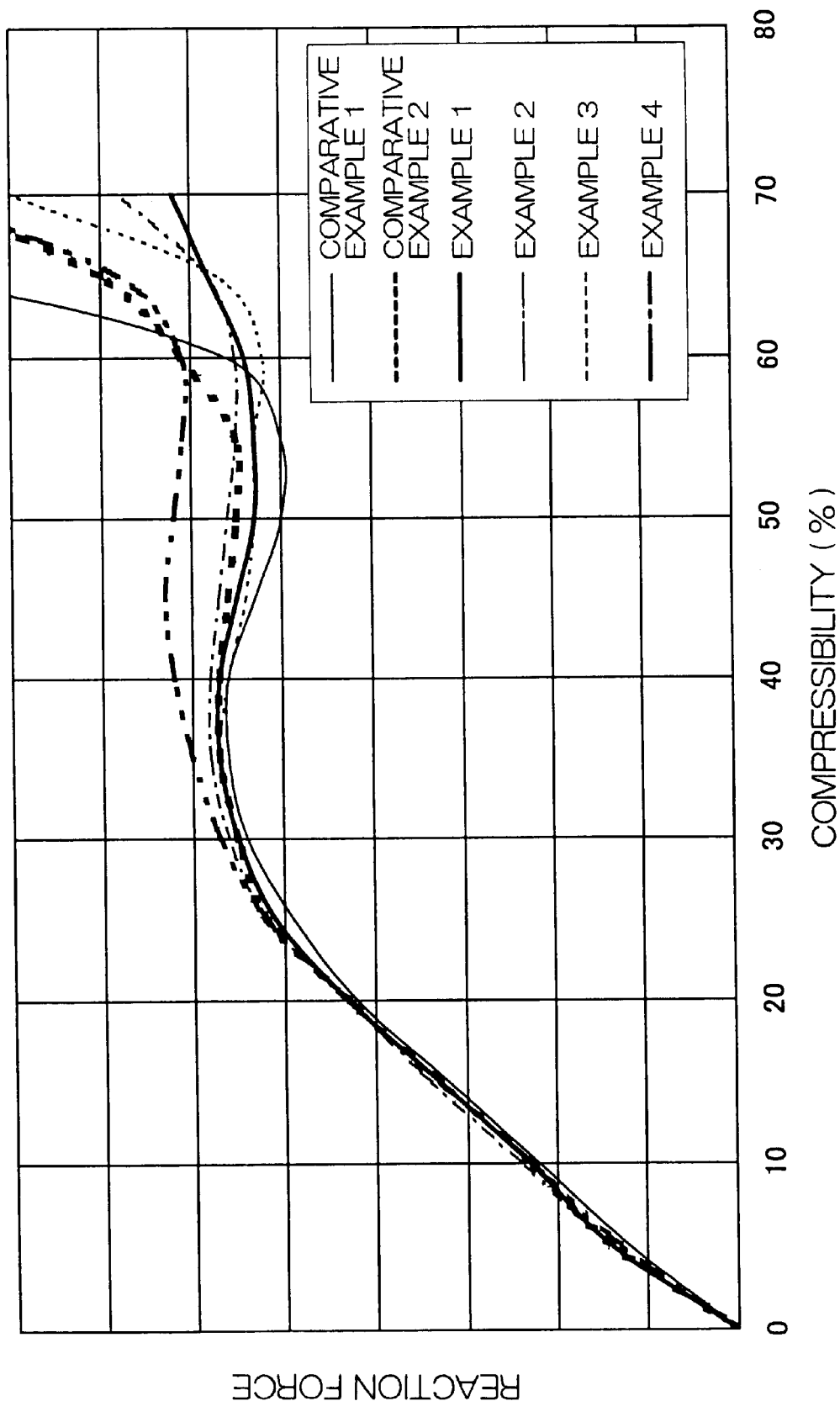
FIG. 11 is a graph representing compressibility-reaction force characteristic curves of the fenders of Examples 1–4 and Comparative Examples 1–2.

As seen from FIG. 11, the fender 9 of comparative Example 1, as the conventional example, had a small compressibility of 60% representing the distortion D at the time when the reaction force, re-increased again, reached the point B representing the same level of reaction force at Maximum Point A. The following was found by continuing the observation of how the compressed fender deformed. After buckling, the fender 9 of Comparative Example 1 assumed the position of FIG. 20B with a smaller distortion than the Examples to be described later, the position wherein the outer peripheries 91*a*, 92*a* of both the members 91, 92 came into contact with each other. This was because the outer peripheries 91*a*, 92*a* defined one continuous, step-free surface.

Figure 20B:
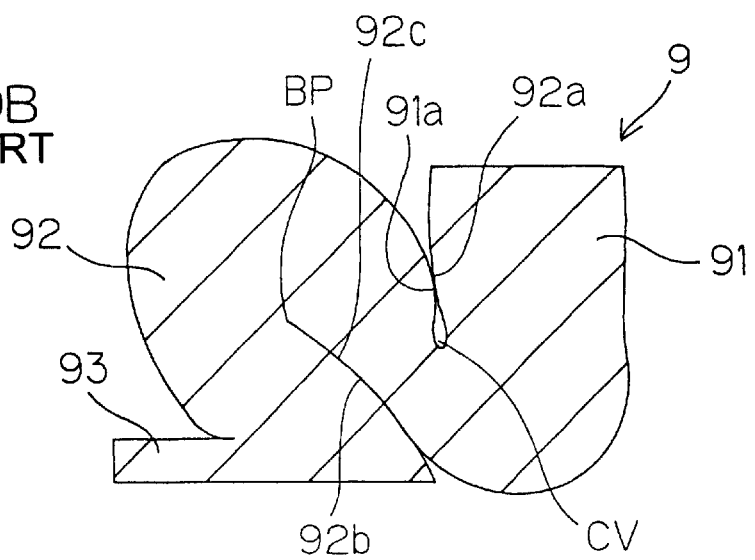
FIG. 20B is an enlarged sectional view showing the fender compressed into a buckled state.
Figure 21:
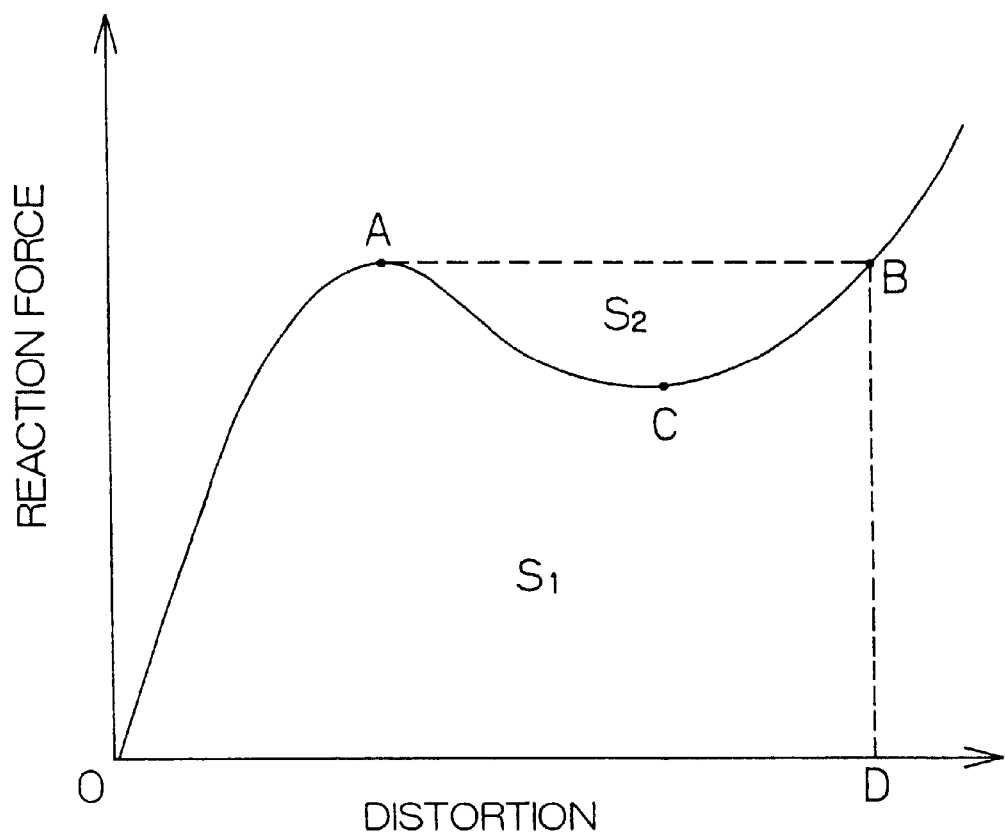
FIG. 21 is a graph representing a distortion-reaction force characteristic curve of the fender of FIG. 20A.

It was also found that the fender 9 of Comparative Example 1 presented a small percentage reaction force of 87.5% at Minimum Point C based on the reaction force at Maximum Point A, thus suffering a great decline in the reaction force after buckling, i.e., after Maximum Point A. The examination of a sectional shape of the buckled fender revealed that, as shown in FIG. 20B, the fender contained a large cavity CV between the bent members 91, 92.

Figure 10B:
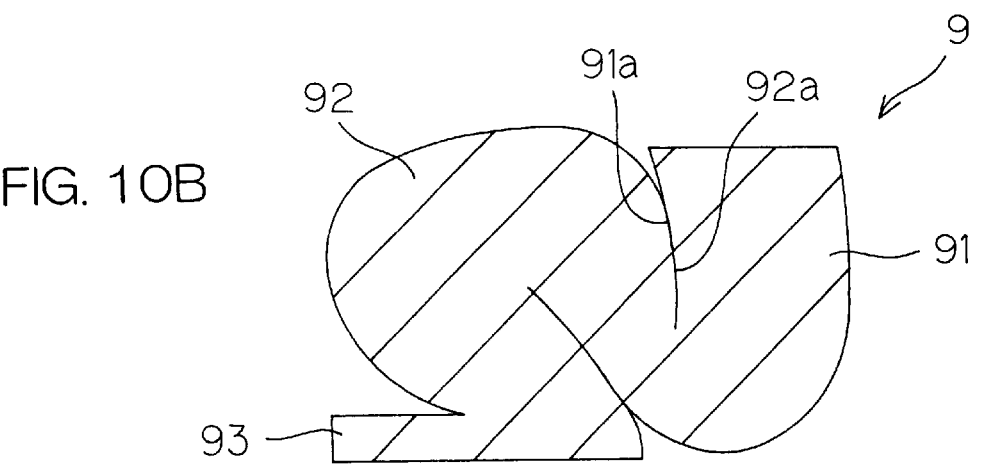
FIG. 10B is an enlarged vertical sectional view showing the fender compressed into a buckled state.

The fender 9 of Comparative Example 2 was also determined to have a small compressibility of 58% representative of the distortion D, the fender wherein the first bumper member 91 was formed in a conical shape with one end having a greater diameter than the other end, the former end having a greater thickness $T_{11}$ than that $T_{12}$ of the latter end. The following was found by continuing the observation of how the compressed fender deformed. After buckling, the fender 9 of Comparative Example 2 assumed the position of FIG. 10B with a smaller distortion than the Examples to be described later, the position wherein the outer peripheries 91*a*, 92*a* of both the members 91, 92 came into contact with each other. This was because the outside diameter of the first bumper member 91 was not constant but increased toward its former end, although the outer peripheries 91a, 92a included the step.

It was also found that the fender 9 of Comparative Example 2 presented a percentage reaction force of 97.0% at Minimum Point C based on the reaction force at Maximum Point A, thus having a small decline in the reaction force after buckling, i.e., after Maximum Point A. The examination of a sectional shape of the buckled fender revealed that a corner of a step 94 formed between the outer peripheries 91a, 92a of the members 91, 92 was caught in the buckled portion, eliminating the cavity thereat.

In contrast, all the fenders 1 of Examples 1–4 were determined to have great comprehensibilities of 62 to 67% representative of the distortion D. The following was found by continuing the observation of how the compressed fender deformed. After buckling, the fenders 1 of the Examples assumed positions, as shown in FIGS. 2B, 7B, 8B and 9B, with greater distortions than Comparative Examples 1–2, the positions wherein the outer peripheries 11a, 12a of both the members 11, 12 came into contact with each other.

It was also found that all the fenders 1 of the Examples had percentage reaction forces at Minimum Point C of 92.5 to 97.5% based on the reaction force at Maximum Point A, thus presenting small declines in the reaction force after buckling, i.e., after Maximum Point A. The examination of sectional shapes of the buckled fenders revealed that a corner of the step 14 formed between the outer peripheries 11a, 12a of the members 11, 12 was caught in the buckled portion, eliminating the cavity thereat.

A comparison of Examples 1, 3 and 4 showed the following tendencies, these Examples having the same ratio $T_1/T_2$ but different ratios $H_1/H_2$ and angles $\theta_1$. With increase in the ratio $H_1/H_2$ and with decrease in the angle $\theta_1$, the overall energy-absorption capacity tends to decline. On the other hand, as the ratio $H_1/H_0$ decreases and the angle $\theta_1$ increases, the constant load area for the first bumper member 11 becomes smaller. The results are tabulated in Table 8.

TABLE 8

| | Reaction force drop at Min. Point C (%) *1 | Compressibility (%) representing distortion D |
|---|---|---|
| Ex. 1 | 92.5 | 63 |
| Ex. 2 | 95.0 | 65.5 |
| Ex. 3 | 97.5 | 65 |
| Ex. 4 | 96.5 | 62.5 |
| C. Ex. 1 | 87.5 | 60 |
| C. Ex. 2 | 97.0 | 58 |

*1 percentage reaction force based on the reaction force at Maximum Point A

Example 5

A circle-type fender 1 was fabricated as follows.

The following materials were charged in a mold and heated under pressure for vulcanizing a rubber base material.

Thus was obtained the fender having the general appearance shown in FIG. 3 and the sectional shape shown in FIGS. 4A, 4B as well as dimensions and an angle listed in Table 9. A projection 15 was of a trapezoidal shape in section, having dimensions listed in Table 10.

A rubber compound: a rubber base material comprising a rubber mixture containing natural rubber and butadiene rubber in a weight ratio of 6:4;

A reinforcement member in one end of the first bumper member 11: a disk-like steel plate having a thickness of 28 mm and an outside diameter of 670 mm and including a through hole of inside diameter of 270 mm at its center; and A reinforcement member in the flange 13: a disk-like steel plate having a thickness of 28 mm and an outside diameter of 1470 mm and including a through hole of inside diameter of 730 mm at its center.

TABLE 9

| $T_1$ | 230 mm |
|---|---|
| $T_2$ | 230 mm |
| $T_1/T_2$ | 1.0 |
| $H_0$ | 1000 mm |
| $H_1$ | 250 mm |
| $H_2$ | 750 mm |
| $H_1/H_0$ | 0.25 |
| $\theta_1$ | 72.5° |
| $D_1$ | 700 mm |
| $D_2$ | 1500 mm |

TABLE 10

| $H_3$ | 375 mm |
|---|---|
| $T_3$ | 20 mm |
| $T_3/T_2 \times 100$ | 8.7% |
| $W_1$ | 100 mm |
| $W_2$ | 125 mm |
| $W_3$ | 50 mm |
| $W_4$ | 50 mm |
| $W_1/W_2$ | 4/5 |
| $W_1 + W_2$ | 225 mm |
| $(W_1 + W_2)/H_2 \times 100$ | 30.0% |

Example 6

The same rubber compound and two types of reinforcement members as in Example 5 were used to fabricate a circle-type fender 1 having the sectional shape shown in FIGS. 5A, 5B as well as dimensions and an angle listed in Table 11. A projection 15 was of a triangular shape in section, having dimensions listed in Table 12.

TABLE 11

| $T_1$ | 230 mm |
|---|---|
| $T_2$ | 230 mm |
| $T_1/T_2$ | 1.0 |
| $H_0$ | 1000 mm |
| $H_1$ | 250 mm |
| $H_2$ | 750 mm |
| $H_1/H_0$ | 0.25 |
| $\theta_1$ | 72.5° |
| $D_1$ | 700 mm |
| $D_2$ | 1500 mm |

TABLE 12

| $H_3$ | 375 mm |
|---|---|
| $T_3$ | 40 mm |
| $T_3/T_2 \times 100$ | 17.4% |
| $W_1$ | 100 mm |
| $W_2$ | 125 mm |
| $W_1/W_2$ | 4/5 |
| $W_1 + W_2$ | 225 mm |
| $(W_1 + W_2)/H_2 \times 100$ | 30.0% |

Comparative Example 3

Figure 22A:
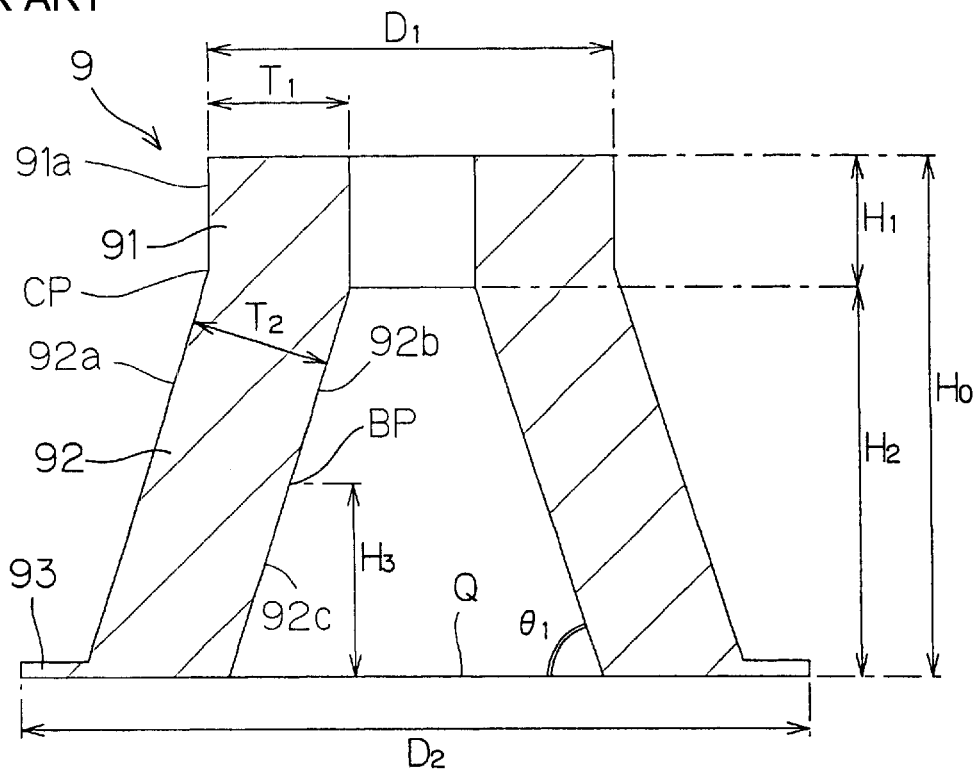

The same rubber compound and two types of reinforcement members as in Example 5 were used to fabricate a circle-type fender 1 having the conventional sectional shape shown in FIG. 22A as well as dimensions and an angle listed in Table 13.

TABLE 13

| | |
|---|---|
| $T_1$ | 265 mm |
| $T_2$ | 265 mm |
| $T_1/T_2$ | 1.0 |
| $H_0$ | 1000 mm |
| $H_1$ | 250 mm |
| $H_2$ | 750 mm |
| $H_1/H_0$ | 0.25 |
| $\theta_1$ | 72.5° |
| $D_1$ | 770 mm |
| $D_2$ | 1500 mm |

Comparative Example 4

Figure 12A:
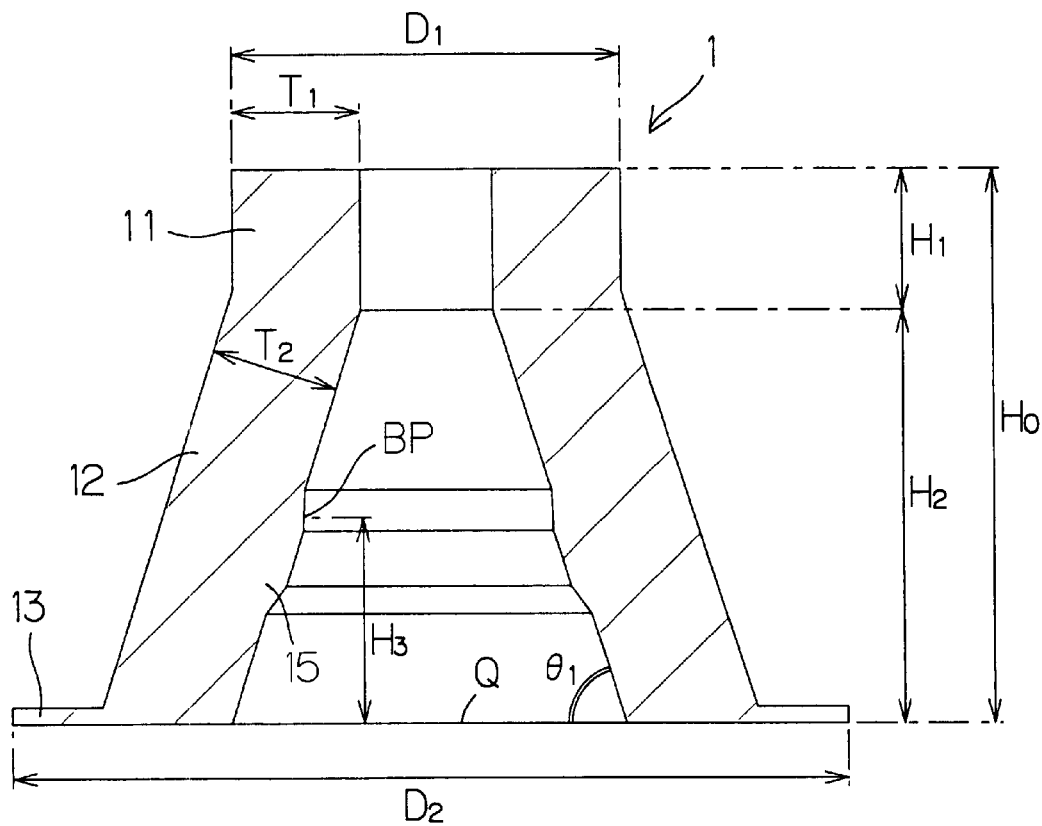
FIG. 12A is a vertical sectional view showing a fender of Comparative Example 4 in a normal, uncompressed state.
Figure 12B:
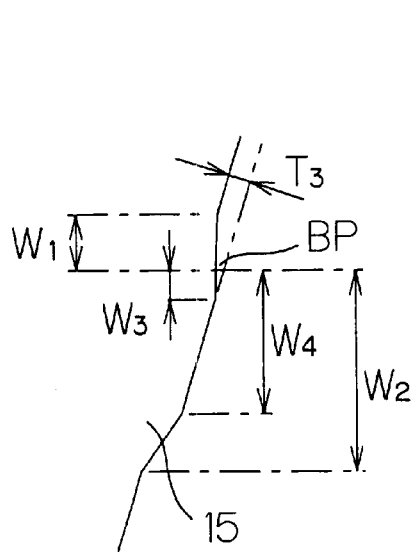
FIG. 12B is an enlarged sectional view showing a projection.

The same rubber compound and two types of reinforcement members as in Example 5 were used to fabricate a circle-type fender 1 having a sectional shape shown in FIGS. 12A, 12B as well as dimensions and an angle listed in Table 14. A projection 15 was of a trapezoidal shape in section, having dimensions listed in Table 15.

TABLE 14

| | |
|---|---|
| $T_1$ | 230 mm |
| $T_2$ | 230 mm |
| $T_1/T_2$ | 1.0 |
| $H_0$ | 1000 mm |
| $H_1$ | 250 mm |
| $H_2$ | 750 mm |
| $H_1/H_0$ | 0.25 |
| $\theta_1$ | 72.5° |
| $D_1$ | 700 mm |
| $D_2$ | 1500 mm |

TABLE 15

| | |
|---|---|
| $H_3$ | 375 mm |
| $T_3$ | 20 mm |
| $T_3/T_2 \times 100$ | 8.7% |
| $W_1$ | 50 mm |
| $W_2$ | 175 mm |
| $W_3$ | 25 mm |
| $W_4$ | 125 mm |
| $W_1/W_2$ | 2/7 |
| $W_1 + W_2$ | 225 mm |
| $(W_1 + W_2)/H_2 \times 100$ | 30.0% |

Comparative Example 5

Figure 13A:
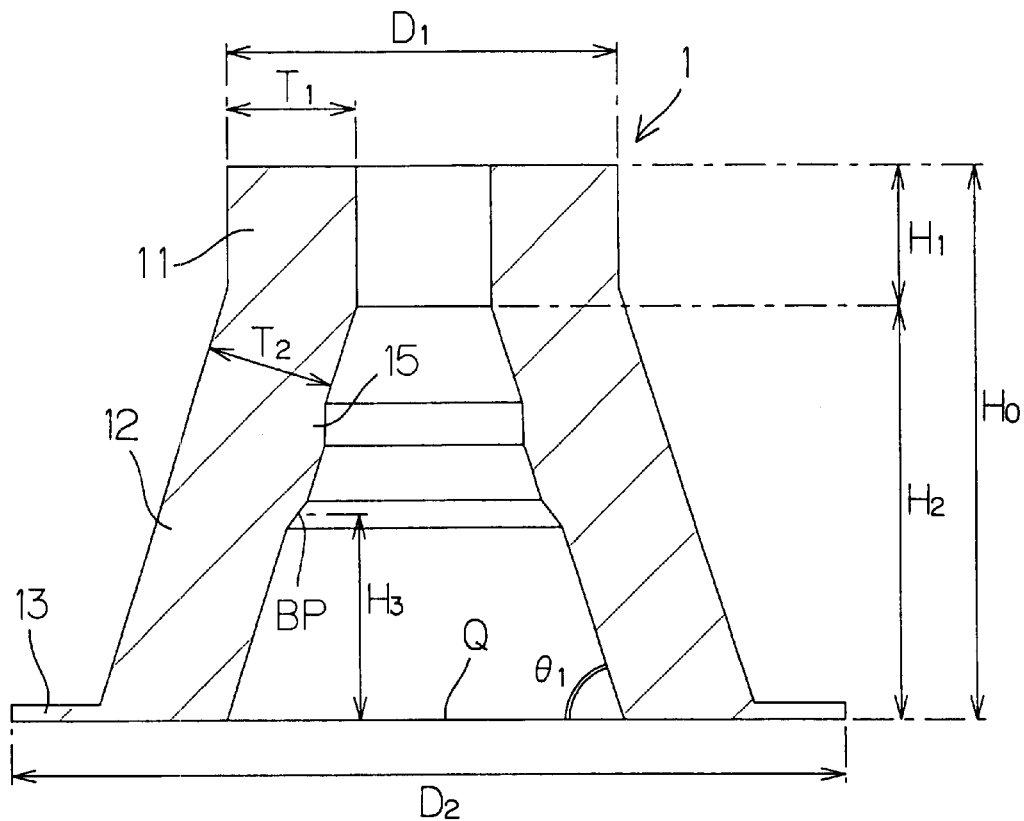
FIG. 13A is a vertical sectional view showing a fender of Comparative Example 5 in a normal, uncompressed state.
Figure 13B:
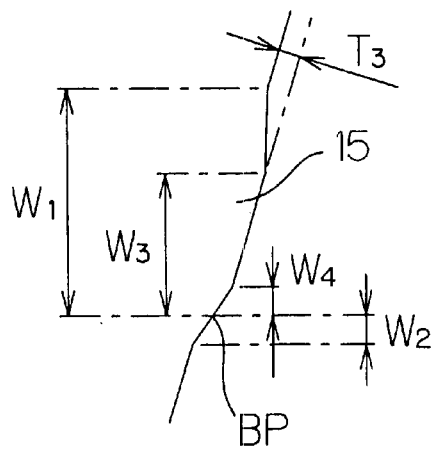
FIG. 13B is an enlarged sectional view showing a projection.

The same rubber compound and two types of reinforcement members as in Example 5 were used to fabricate a circle-type fender 1 having a sectional shape shown in FIGS. 13A, 13B as well as dimensions and an angle listed in Table 16. A projection 15 was of a trapezoidal shape in section, having dimensions listed in Table 17.

TABLE 16

| | |
|---|---|
| $T_1$ | 230 mm |
| $T_2$ | 230 mm |
| $T_1/T_2$ | 1.0 |
| $H_0$ | 1000 mm |
| $H_1$ | 250 mm |
| $H_2$ | 750 mm |
| $H_1/H_0$ | 0.25 |
| $\theta_1$ | 72.5° |
| $D_1$ | 700 mm |
| $D_2$ | 1500 mm |

TABLE 17

| | |
|---|---|
| $H_3$ | 375 mm |
| $T_3$ | 20 mm |
| $T_3/T_2 \times 100$ | 8.7% |
| $W_1$ | 200 mm |
| $W_2$ | 25 mm |
| $W_3$ | 125 mm |
| $W_4$ | 25 mm |
| $W_1/W_2$ | 8/1 |
| $W_1 + W_2$ | 225 mm |
| $(W_1 + W_2)/H_2 \times 100$ | 30.0% |

Principal dimensions of the above Examples, Comparative Examples and Comparative Example 1 are tabulated in Table 18.

TABLE 18

| | $T_2$ | $T_3$ | $T_3/T_2 \times 100$ | $H_3$ | $W_1$ | $W_2$ | $W_1/W_2$ | $W_1 + W_2$ | $(W_1 + W_2)/H_2 \times 100$ |
|---|---|---|---|---|---|---|---|---|---|
| Ex.5 | 230 | 20 | 8.7 | 375 | 100 | 125 | 4/5 | 225 | 30.0 |
| EX.6 | 230 | 40 | 17.4 | 375 | 100 | 125 | 4/5 | 225 | 30.0 |
| CEx.1 | 230 | — | — | 375 | — | — | — | — | — |
| CEx.3 | 265 | — | — | 375 | — | — | — | — | — |
| CEx.4 | 230 | 20 | 8.7 | 375 | 50 | 175 | 2/7 | 225 | 30.0 |
| CEx.5 | 230 | 20 | 8.7 | 375 | 200 | 25 | 8/1 | 225 | 30.0 |

The fenders of the above Examples and Comparative Examples were subjected to the aforesaid compressive test. The results are shown in the graph of FIG. 14.

Figure 14:
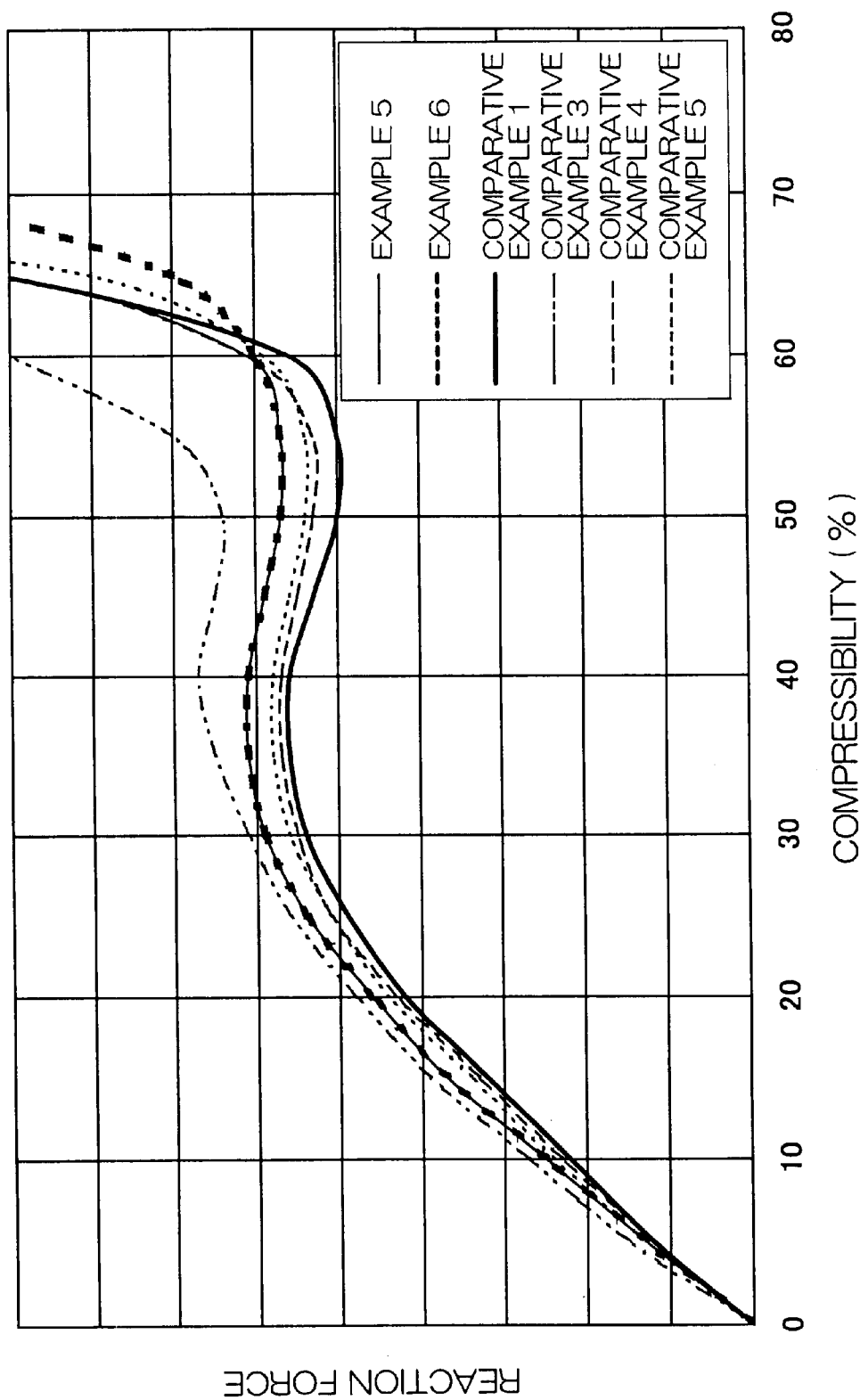
FIG. 14 is a graph representing compressibility-reaction force characteristic curves of the fenders of Examples 5–6 and Comparative Examples 1, 3–5.
Figure 22B:
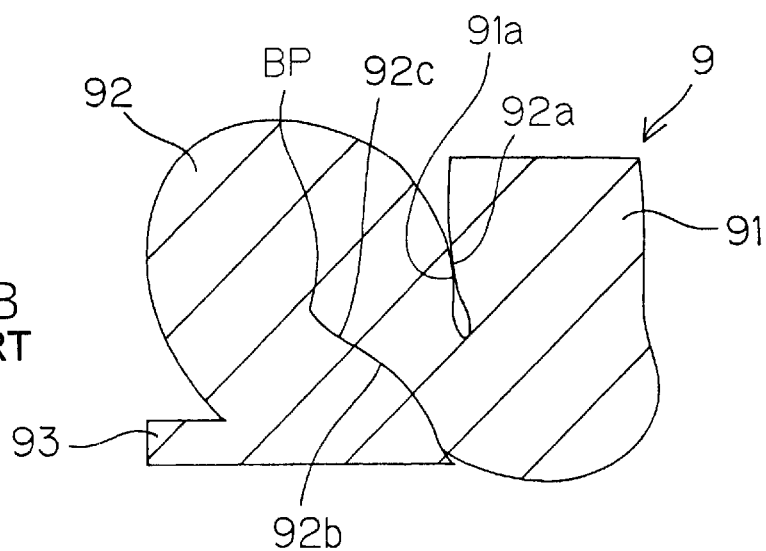
FIG. 22B is an enlarged vertical sectional view showing the fender compressed into a buckled state.
Figure 23:
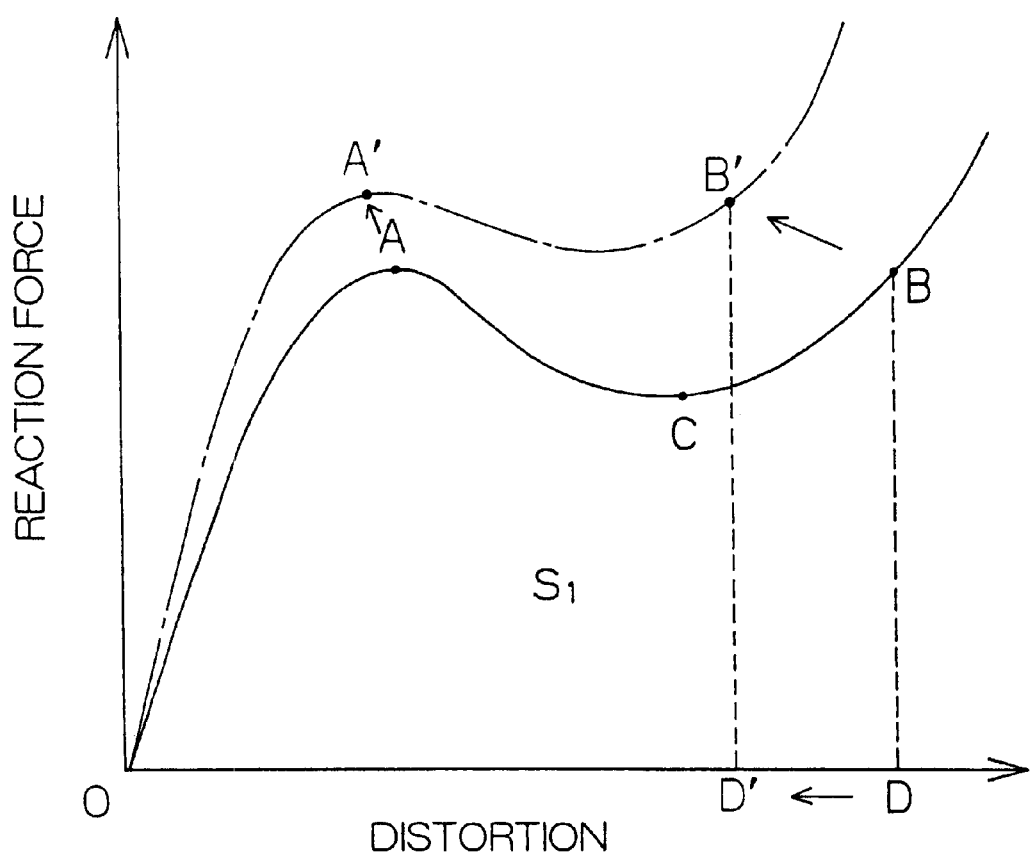
FIG. 23 is a graph representing distortion-reaction force characteristic curves of the fenders of FIGS. 20A and 22A.

As seen from FIG. 14, the fender 9 of Comparative Example 3 having a greater thickness of the first and second bumper members 91, 92 than those of Comparative Example 1 had an increased percentage reaction force of 119% at Maximum Point A based on that of Comparative Example 1. It was found, however, that the fender 9 of Comparative Example 3 had a small compressibility of 53% representative of the distortion D. The following was found by continuing the observation of how the compressed fender was deformed. After buckling, the fender 9 of Comparative Example 3 assumed the position of FIG. 22B with a smaller distortion than Comparative Example 1 and the Examples to be described later, the position wherein the areas 92b, 92c above and below the buckling position BP on the inner periphery of the second bumper member 92 came into contact with each other. This was because, as mentioned supra, the second bumper member 92 was increased in thickness.

Figure 12C:
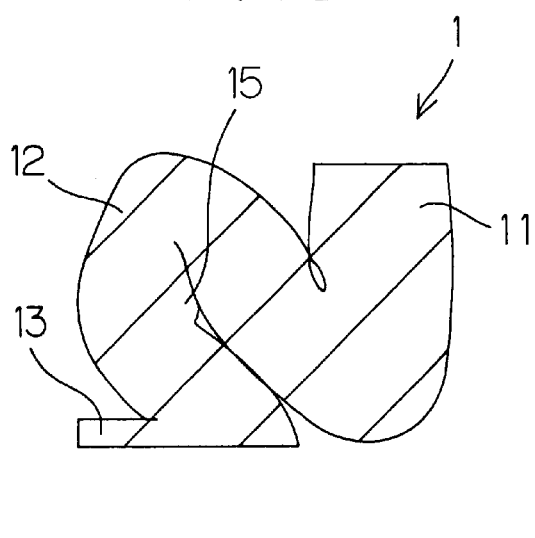
FIG. 12C is an enlarged vertical sectional view showing the fender compressed into a buckled state.

The fender 1 of Comparative Example 4 had the projection shifted downward relative to the buckling position BP, had a percentage reaction force of 102% at Maximum Point A based on that of Comparative Example 1, showing little increase in the reaction force. It was also found that the fender 1 of Comparative Example 4 had a small compressibility of 58% representative of the distortion D. The examination of a sectional shape of the buckled fender 1 of Comparative Example 4 revealed that the fender was buckled along the upper side of the projection 15, as shown in FIG. 12C.

Figure 13C:
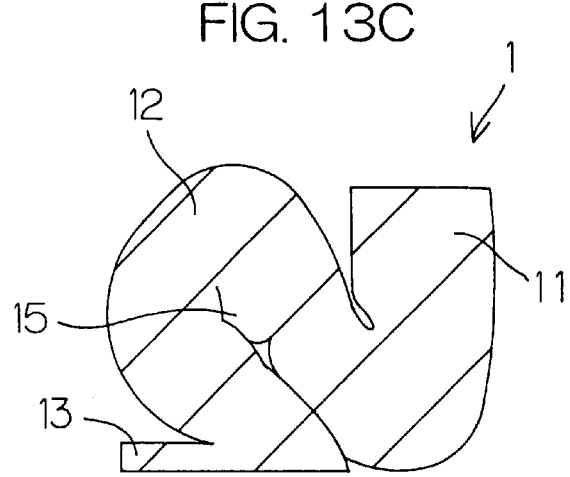
FIG. 13C is an enlarged vertical sectional view showing the fender compressed into a buckled state.

The fender 1 of Comparative Example 5 had the projection shifted upward relative to the buckling position BP, had a percentage reaction force of 103% at Maximum Point A based on that of Comparative Example 1, showing little increase in the reaction force. It was also found that the fender 1 of Comparative Example 5 had a small compressibility of 58% representative of the distortion D. The examination of a sectional shape of the buckled fender 1 of Comparative Example 5 revealed that the fender was buckled along the lower side of the projection 15, as shown in FIG. 13C.

Figure 4C:
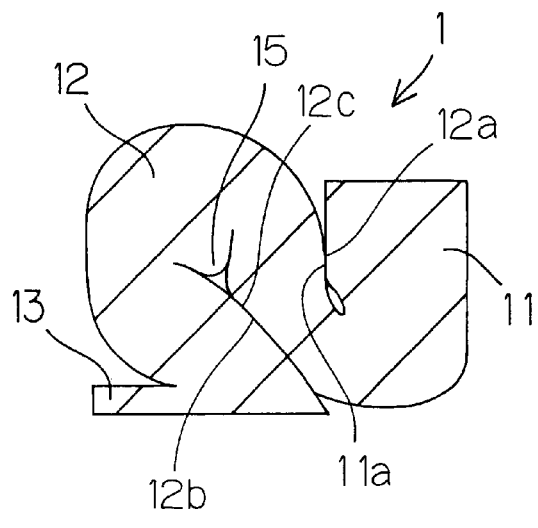
FIG. 4C is an enlarged vertical sectional view showing the fender compressed into a buckled state.
Figure 5C:
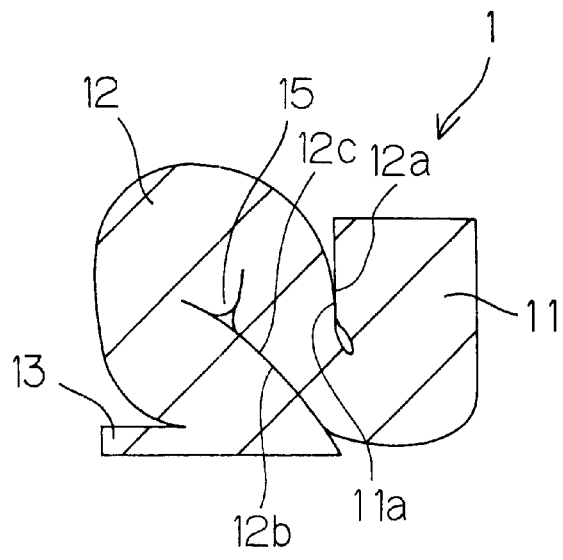
FIG. 5C is an enlarged vertical sectional view showing the fender compressed into a buckled state.

In contrast, the fenders 1 of Examples 5, 6 both trained increased percentage reaction forces of 110% t Maximum Point A based on that of Comparative Example 1. It was also found that both the fenders of these Examples had a great compressibility of 62% representative of the distortion D. The examination of sectional forms of the buckled fenders 1 of Examples 5, 6 revealed that the fenders assumed a buckled position, as shown in FIGS. 4C and 5C, respectively, wherein the second bumper member 12 buckled in a manner to clamp the projection 15. The following was found by continuing the observation of how the compressed fender deformed. After buckling, the fenders 1 of these Examples assumed the respective positions shown in FIGS. 4C and 5C with a greater distortion D than the Comparative Examples because of the projection 15 clamped in the above manner, the position wherein the areas 12b, 12c above and below the projection 15 on the inner periphery of the second bumper member 12 came into contact with each other. The results are tabulated in Table 19.

TABLE 19

| | Increase of percentage reaction force at Max. Point A (%) *2 | Compressibility (%) representing distortion D |
|---|---|---|
| Ex. 5 | 110 | 62 |
| Ex. 6 | 110 | 62 |
| C. Ex. 1 | 100 | 60 |
| C. Ex. 3 | 119 | 53 |
| C. Ex. 4 | 102 | 58 |
| C. Ex. 5 | 103 | 58 |

*1 percentage reaction force based on the reaction force of Comparative Example 1 (100%)

Example 7

The same rubber compound as in Example 5 and the following two reinforcement members were used to fabricate a circle-type fender 1 having a sectional shape shown in FIGS. 6A, 6B as well as dimensions and an angle listed in Table 20. A projection 15 was of a trapezoidal shape in section, having dimensions listed in Table 21.

A reinforcement member in one end of the first bumper member 11: a disk-like steel plate having a thickness of 28 mm and an outside diameter of 650 mm and including a through hole of inside diameter of 270 mm at its center; and A reinforcement member in the flange 13: the same steel plate as in Example 5

TABLE 20

| | |
|---|---|
| $T_1$ | 220 mm |
| $T_2$ | 244 mm |
| $T_1/T_2$ | 0.9 |
| $H_0$ | 1000 mm |
| $H_1$ | 180 mm |
| $H_2$ | 820 mm |
| $H_1/H_0$ | 0.18 |
| $\theta_1$ | 75.0° |
| $D_1$ | 680 mm |
| $D_2$ | 1500 mm |

TABLE 21

| | |
|---|---|
| $H_3$ | 410 mm |
| $T_3$ | 20 mm |
| $T_3/T_2 \times 100$ | 8.2% |
| $W_1$ | 100 mm |
| $W_2$ | 125 mm |
| $W_3$ | 50 mm |
| $W_4$ | 50 mm |
| $W_1/W_2$ | 4/5 |
| $W_1 + W_2$ | 225 mm |
| $(W_1 + W_2)/H_2 \times 100$ | 27.4% |

Example 8

Figure 15A:
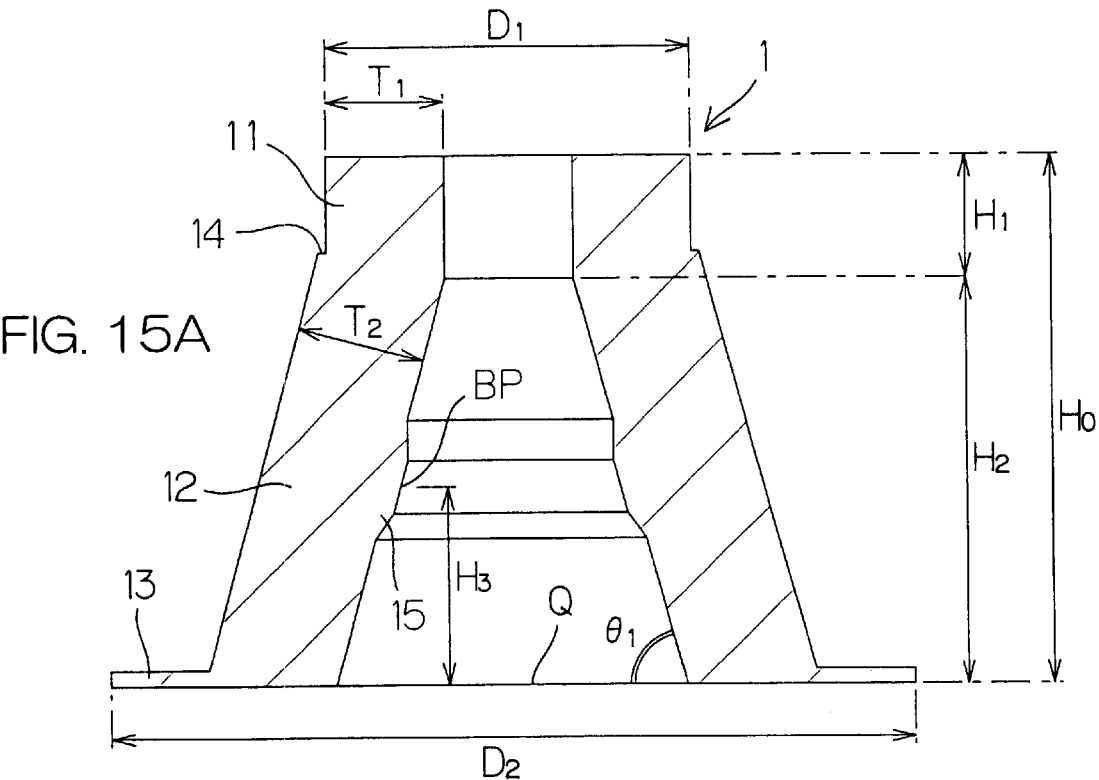
Figure 15B:
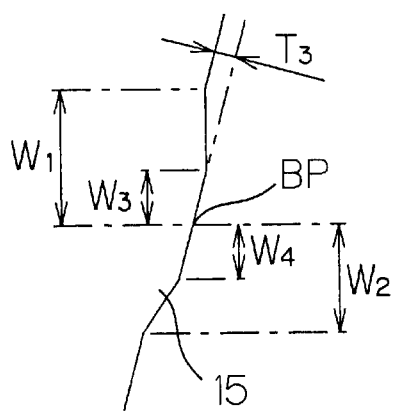
FIG. 15B is an enlarged sectional view showing a projection.

The same rubber compound and two reinforcement members as in Example 7 were used to fabricate a circle-type fender 1 having a sectional shape shown in FIGS. 15A, 15B as well as dimensions and an angle listed in Table 22. A projection 15 was of a trapezoidal shape in section, having dimensions listed in Table 23.

TABLE 22

| | |
|---|---|
| $T_1$ | 220 mm |
| $T_2$ | 244 mm |
| $T_1/T_2$ | 0.9 |
| $H_0$ | 1000 mm |
| $H_1$ | 230 mm |
| $H_2$ | 770 mm |
| $H_1/H_0$ | 0.23 |
| $\theta_1$ | 75.0° |
| $D_1$ | 680 mm |
| $D_2$ | 1500 mm |

TABLE 23

| | |
|---|---|
| $H_3$ | 380 mm |
| $T_3$ | 20 mm |
| $T_3/T_2 \times 100$ | 8.2% |
| $W_1$ | 100 mm |
| $W_2$ | 125 mm |
| $W_3$ | 50 mm |
| $W_4$ | 50 mm |
| $W_1/W_2$ | 4/5 |
| $W_1 + W_2$ | 225 mm |
| $(W_1 + W_2)/H_2 \times 100$ | 29.2% |

Example 9

Figure 16A:
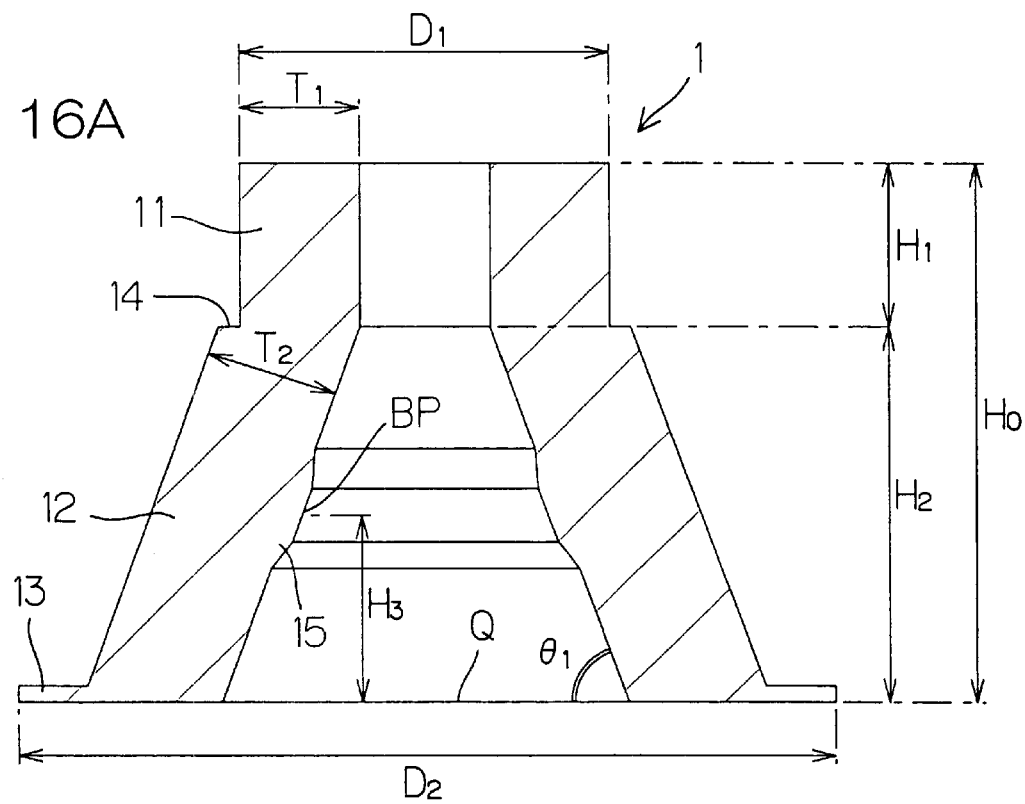
Figure 16B:
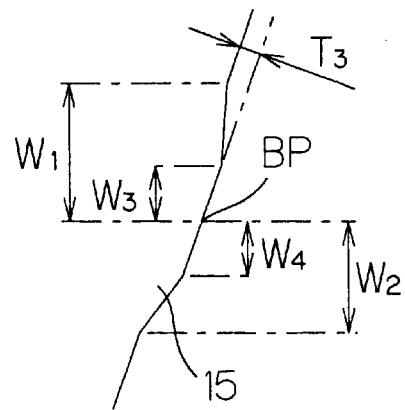
FIG. 16B is an enlarged sectional view showing a projection.

The same rubber compound and two reinforcement members as in Example 7 were used to fabricate a circle-type fender 1 having a sectional shape shown in FIGS. 16A, 16B as well as dimensions and an angle listed in Table 24. A projection 15 was of a trapezoidal shape in section, having dimensions listed in Table 25.

TABLE 24

| | |
|---|---|
| $T_1$ | 220 mm |
| $T_2$ | 244 mm |
| $T_1/T_2$ | 0.9 |
| $H_0$ | 1000 mm |
| $H_1$ | 300 mm |
| $H_2$ | 700 mm |
| $H_1/H_0$ | 0.30 |
| $\theta_1$ | 70.0° |
| $D_1$ | 680 mm |
| $D_2$ | 1500 mm |

TABLE 25

| | |
|---|---|
| $H_3$ | 350 mm |
| $T_3$ | 20 mm |
| $T_3/T_2 \times 100$ | 8.2% |
| $W_1$ | 100 mm |
| $W_2$ | 125 mm |
| $W_3$ | 50 mm |
| $W_4$ | 50 mm |
| $W_1/W_2$ | 4/5 |
| $W_1 + W_2$ | 225 mm |
| $(W_1 + W_2)/H_2 \times 100$ | 32.1% |

Example 10

Figure 17A:
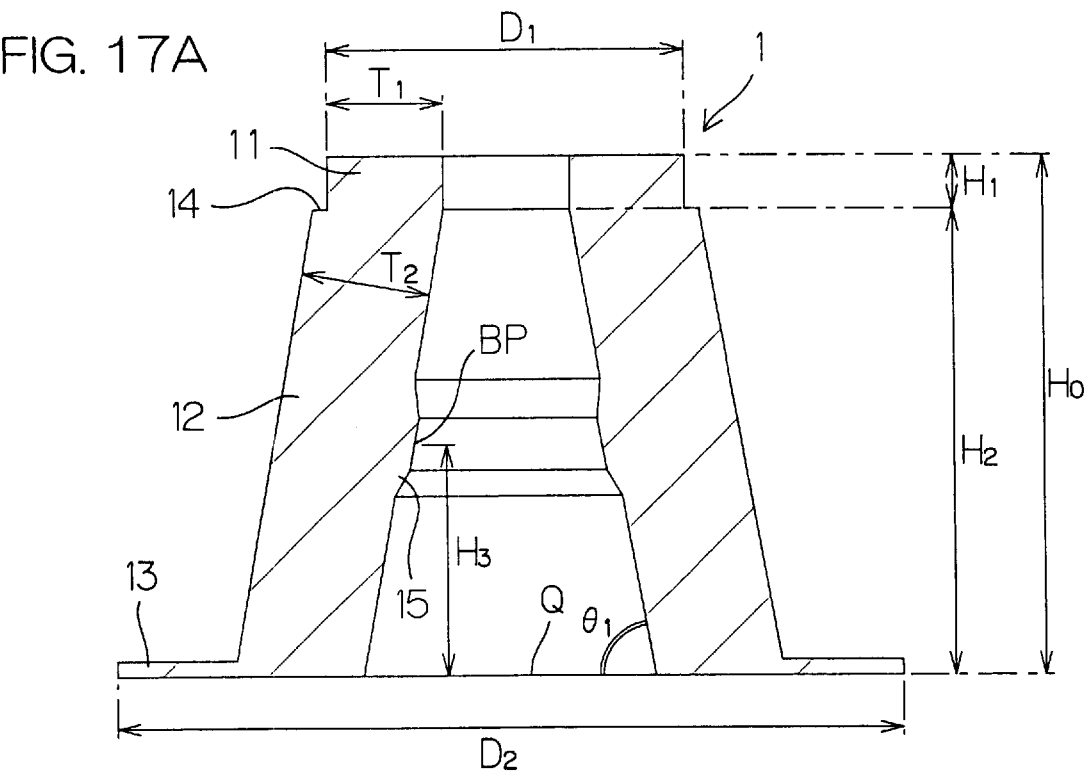
Figure 17B:
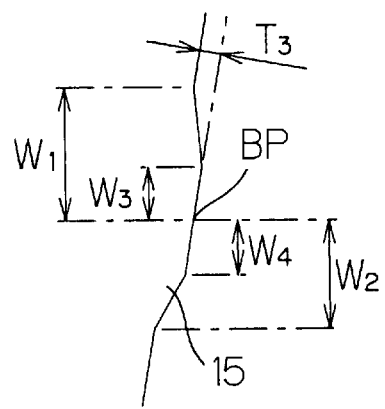
FIG. 17B is an enlarged sectional view showing a projection.

The same rubber compound and two reinforcement members as in Example 7 were used to fabricate a circle-type fender 1 having a sectional shape shown in FIGS. 17A, 17B as well as dimensions and an angle listed in Table 26. A projection 15 was of a trapezoidal shape in section, having dimensions listed in Table 27.

TABLE 26

| | |
|---|---|
| $T_1$ | 220 mm |
| $T_2$ | 244 mm |
| $T_1/T_2$ | 0.9 |
| $H_0$ | 1000 mm |
| $H_1$ | 100 mm |
| $H_2$ | 900 mm |
| $H_1/H_0$ | 0.10 |
| $\theta_1$ | 80.0° |
| $D_1$ | 680 mm |
| $D_2$ | 1500 mm |

TABLE 27

| | |
|---|---|
| $H_3$ | 450 mm |
| $T_3$ | 20 mm |
| $T_3/T_2 \times 100$ | 8.2% |
| $W_1$ | 100 mm |
| $W_2$ | 125 mm |

TABLE 27-continued

| | |
|---|---|
| $W_3$ | 50 mm |
| $W_4$ | 50 mm |
| $W_1/W_2$ | 4/5 |
| $W_1 + W_2$ | 225 mm |
| $(W_1 + W_2)/H_2 \times 100$ | 25.0% |

Comparative Example 6

Figure 18A:
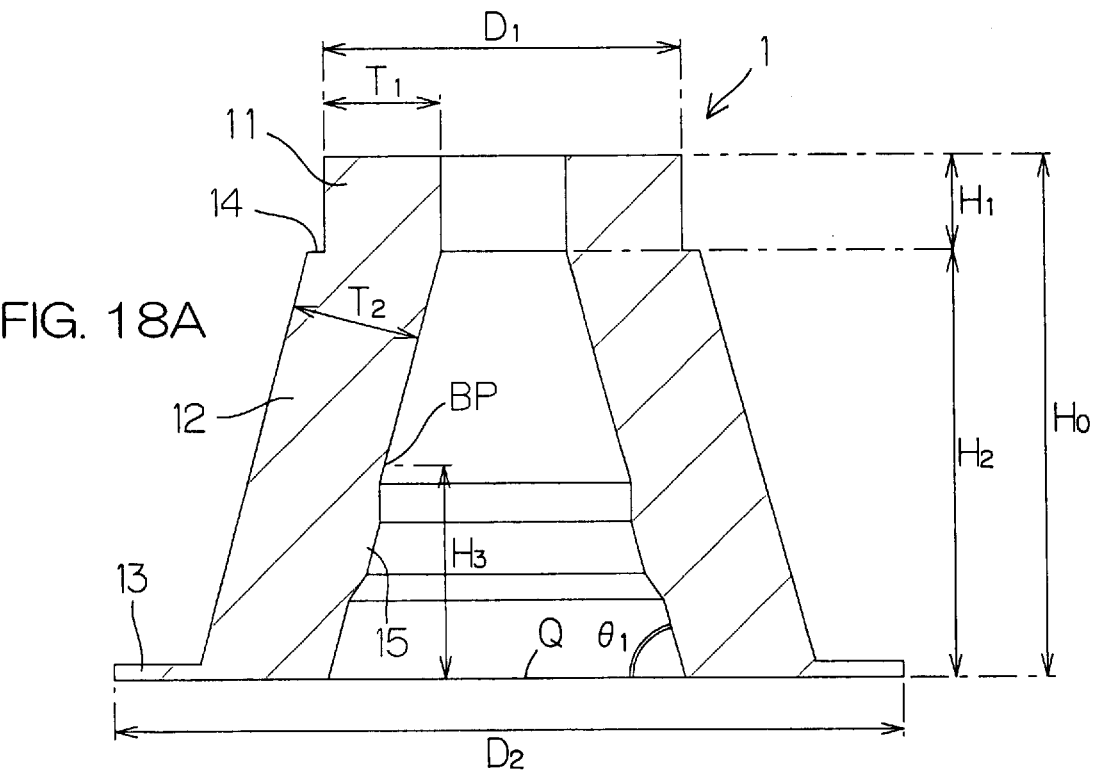
Figure 18B:
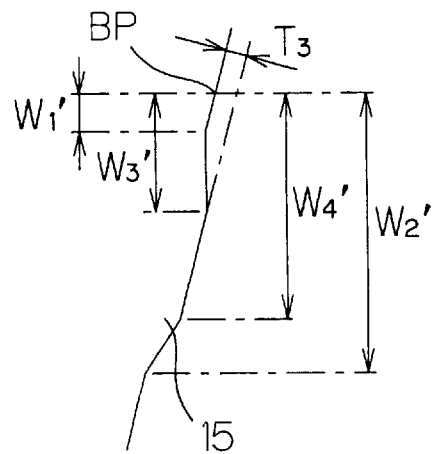
FIG. 18B is an enlarged sectional view showing a projection.

The same rubber compound and two reinforcement members as in Example 7 were used to fabricate a circle-type fender 1 having a sectional shape shown in FIGS. 18A, 18B as well as dimensions and an angle listed in Table 28. A projection 15 was of a trapezoidal shape in section, having dimensions listed in Table 29.

TABLE 28

| | |
|---|---|
| $T_1$ | 220 mm |
| $T_2$ | 244 mm |
| $T_1/T_2$ | 0.9 |
| $H_0$ | 1000 mm |
| $H_1$ | 180 mm |
| $H_2$ | 820 mm |
| $H_1/H_0$ | 0.18 |
| $\theta_1$ | 75.0° |
| $D_1$ | 680 mm |
| $D_2$ | 1500 mm |

TABLE 29

| | |
|---|---|
| $H_3$ | 410 mm |
| $T_3$ | 20 mm |
| $T_3/T_2 \times 100$ | 8.2% |
| $W_1'$ | 35 mm |
| $W_2'$ | 260 mm |
| $W_3'$ | 110 mm |
| $W_4'$ | 210 mm |

The principal dimensions of the above Examples and Comparative Example are tabulated in Table 30.

TABLE 30

| | $T_1$ | $T_2$ | $T_3$ | $T_1/T_2$ | $T_3/T_2 \times 100$ | $H_1$ | $H_1/H_0$ | $H_3$ | $W_1$ | $W_2$ | $W_1/W_2$ | $W_1 + W_2$ | $(W_1 + W_2)/H_2 \times 100$ |
|---|---|---|---|---|---|---|---|---|---|---|---|---|---|
| Ex7 | 220 | 244 | 20 | 0.9 | 8.2 | 180 | 0.18 | 410 | 100 | 125 | 4/5 | 225 | 27.4 |
| Ex8 | 220 | 244 | 20 | 0.9 | 8.2 | 230 | 0.23 | 380 | 100 | 125 | 4/5 | 225 | 29.2 |
| Ex9 | 220 | 244 | 20 | 0.9 | 8.2 | 300 | 0.30 | 350 | 100 | 125 | 4/5 | 225 | 32.1 |
| Ex10 | 220 | 244 | 20 | 0.9 | 8.2 | 100 | 0.10 | 450 | 100 | 125 | 4/5 | 225 | 25.0 |
| CEx6 | 220 | 244 | 20 | 0.9 | 8.2 | 180 | 0.18 | 410 | (35) | (260) | — | (225) | (27.4) |

The fenders of the above Examples and Comparative Example were subjected to the aforesaid compressive test. The results are shown in the graph of FIG. 19.

Figure 19:
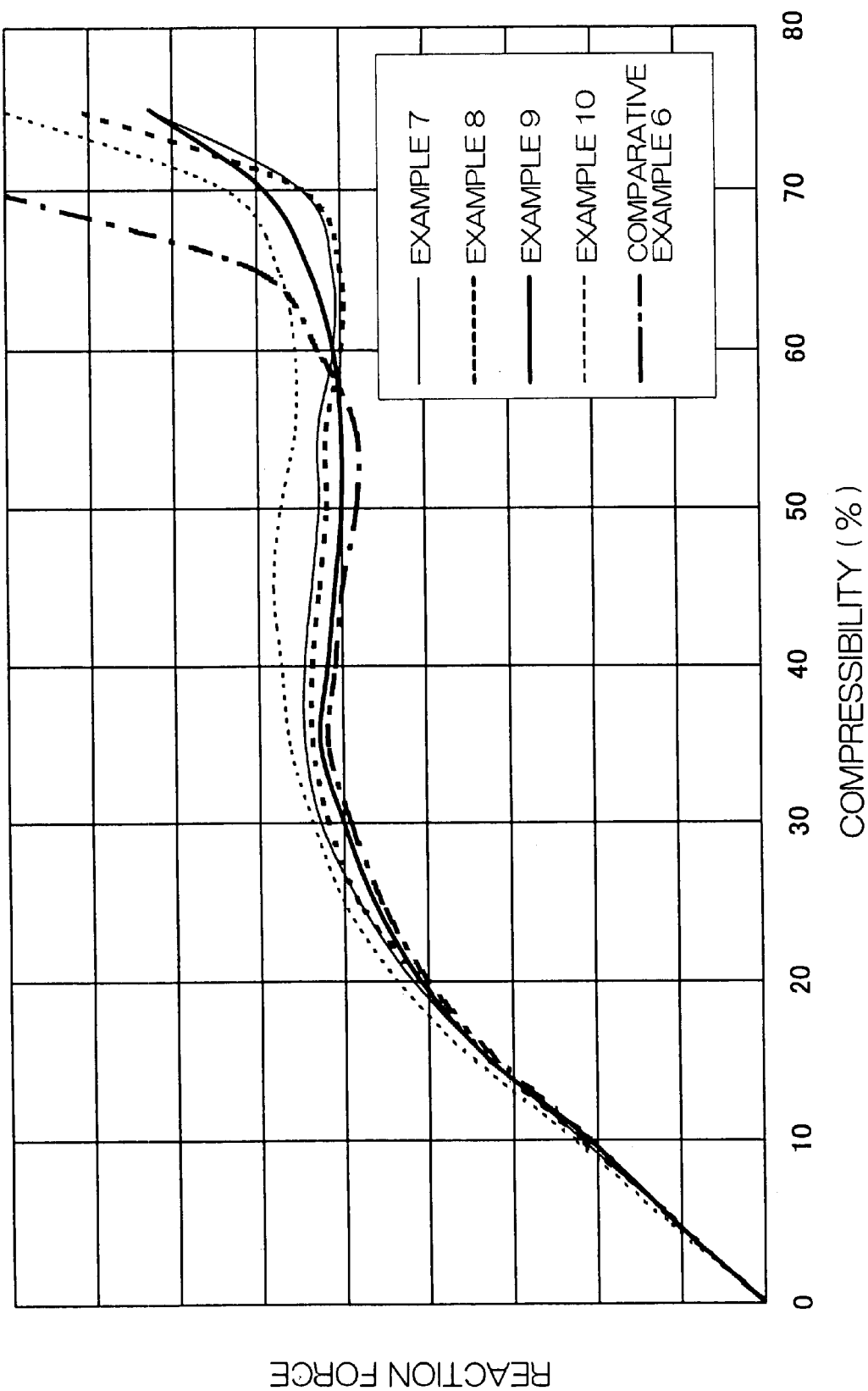
FIG. 19 is a graph representing compressibility-reaction force characteristic curves of the fenders of Examples 7–10 and Comparative Example 6.

As seen from FIG. 19, the fender 1 of Comparative Example 6 had a small compressibility of 58% representative of the distortion D. The fender 1 of Comparative Example 6 had a percentage reaction force of 91% at Minimum Point C based on the reaction force at Maximum Point A, thus showing a small decline in the reaction force after buckling, i.e., after Maximum Point A.

In contrast, all the fenders 1 of Examples 7–10 were determined to have great comprehensibilities of 67 to 70% representative of the distortion D. The fenders 1 of Examples 7–10 had percentage reaction forces of 91 to 95% at Minimum Point C based on the reaction force at Maximum Point A, thus showing small declines in the reaction force after buckling, i.e., after Maximum Point A.

A comparison of the Examples showed that with increase in the ratio $H_1/H_0$ and with decrease in the angle $\theta_1$ the overall energy absorption tends to decline. On the other hand, as the ratio $H_1/H_2$ decreases and the angle $\theta_1$ increases, the constant load area for the first bumper member 11 becomes smaller. The results are tabulated in Table 31.

TABLE 31

| | Reaction force drop at Min. oint C (%) *1 | Compressibility (%) representing distortion D |
|---|---|---|
| Ex. 7 | 93 | 70 |
| Ex. 8 | 91 | 70 |
| Ex. 9 | 94 | 63 |
| Ex. 10 | 95 | 67 |
| C. Ex. 6 | 91 | 58 |

*1 percentage reaction force based on the reaction force at Maximum Point A

What is claimed is:

1. A fender for absorbing the impact of a vessel, formed of rubber and fixed to a fixing surface of a dock and adapted to have an impact receiving plate secured to a distal end of a body of the fender, the fender comprising:
    a first bumper member having an elongated hollow cylindrical body of a constant outside diameter and defining at one end of the cylindrical body thereof a fixing portion for said impact receiving plate;
    a second bumper member connected at one end to an opposite end of the cylindrical body of said first bumper member, defining at said opposite end thereof a fixing portion to be fixed to said fixing surface, said fixing portion having a hollow conical body with its distal end being greater in outside diameter than its closest end, and said second bumper member buckling radially outwardly upon receiving a compressive force from the vessel thereby absorbing the impact of the vessel; and
    a step formed along an outer periphery of a connection portion between said first and second bumper members, said step defined by said closest end of said second bumper member having a greater outside diameter than said opposite end of said first bumper member.

2. The fender as claimed in claim 1, wherein said first and second bumper members have the same inside diameter at the point of attachment to each other, and
    wherein the ratio of $T_1/T_2$ is in the range of 0.8 to 0.9, where $T_1$ is the thickness of the first bumper member, and $T_2$ is the thickness of the second bumper member.

3. The fender as claimed in claim 1, wherein the ratio $H_1/H_0$ is in the range of 0.1 to 0.3, where $H_1$ is the axial height of the cylindrical body of the first bumper member, and $H_0$ is the overall height of the fender with respect to the axis of the cylindrical body.

4. The fender as claimed in claim 3, wherein an angle $\theta_1$ defined by the intersection of the fixing surface and a generatrix of the conical body of the second bumper member is in the range of 70 to 80°.

5. A fender for absorbing the impact of a vessel, formed of rubber and fixed to a fixing surface of a dock and adapted to have an impact receiving plate secured to a distal end of a body of the fender, the fender comprising:
    a first bumper member having an elongate hollow cylindrical body of a constant outside diameter and defining at one end of the cylindrical body thereof a fixing portion for said impact receiving plate;
    a second bumper member connected at one end to an opposite end of the cylindrical body of said first bumper member, defining at said opposite end thereof a fixing portion to be fixed to said fixing surface, said second bumper member having a hollow conical body with its distal end being greater in outside diameter than its closest end, and said second bumper member buckling radially outwardly upon receiving a compressive force from said vessel thereby absorbing the impact of the vessel; and
    a projection having a constant width and formed on and along a buckling position on an inner periphery of said second bumper member.

6. The fender as claimed in claim 5, wherein the ratio of $W_1/W_2$ is in the range of 3/6 to 6/3, where $W_1$ is the distance from the buckling position to an upper side of said projection along an axis of the conical body of said second bumper member, $W_2$ is the distance from the buckling position to a lower side of said projection along the axis of the conical body.

7. The fender as claimed in claim 6, wherein a distance $W_1+W_2$ between the upper side and the lower side of said projection along the axis of the conical body is in the range of 20 to 40% at the height $H_2$ of said second bumper member along the axis of the conical body.

8. The fender as claimed in claim 7, wherein the projection is of a trapezoidal shape in section and has the thickness $T_3$ from the inner periphery of said second bumper member is in the range of 15 to 20% at the thickness $T_2$ of said second bumper member.

9. The fender as claimed in claim 7, wherein the projection is of a triangular shape in section and has the thickness $T_3$ from the inner periphery of said second bumper member is in the range of 15 to 20% at the thickness $T_2$ of said second bumper member.

10. The fender as claimed in claim 5, further comprising a step along an outer periphery of a connection portion between said first and second bumper members, said step defined by the closest end of said second bumper member having a greater outside diameter than said opposite end of said first bumper member.

* * * * *